L. C. PALMER.
BOX MAKING MACHINE.
APPLICATION FILED MAY 14, 1918.

1,312,570.

Patented Aug. 12, 1919.
22 SHEETS—SHEET 1.

Fig_1_

INVENTOR
L. C. Palmer
BY
Drull, Warfield & Drull
ATTORNEY

Fig_2_

L. C. PALMER.
BOX MAKING MACHINE.
APPLICATION FILED MAY 14, 1918

1,312,570.

Patented Aug. 12, 1919.
22 SHEETS—SHEET 4.

INVENTOR
L. C. Palmer
BY
Duell, Warfield & Duell
ATTORNEY

L. C. PALMER.
BOX MAKING MACHINE.
APPLICATION FILED MAY 14, 1918

1,312,570.

Patented Aug. 12, 1919.
22 SHEETS—SHEET 6.

INVENTOR
L. C. Palmer
BY
Duell, Warfield & Duell
ATTORNEY

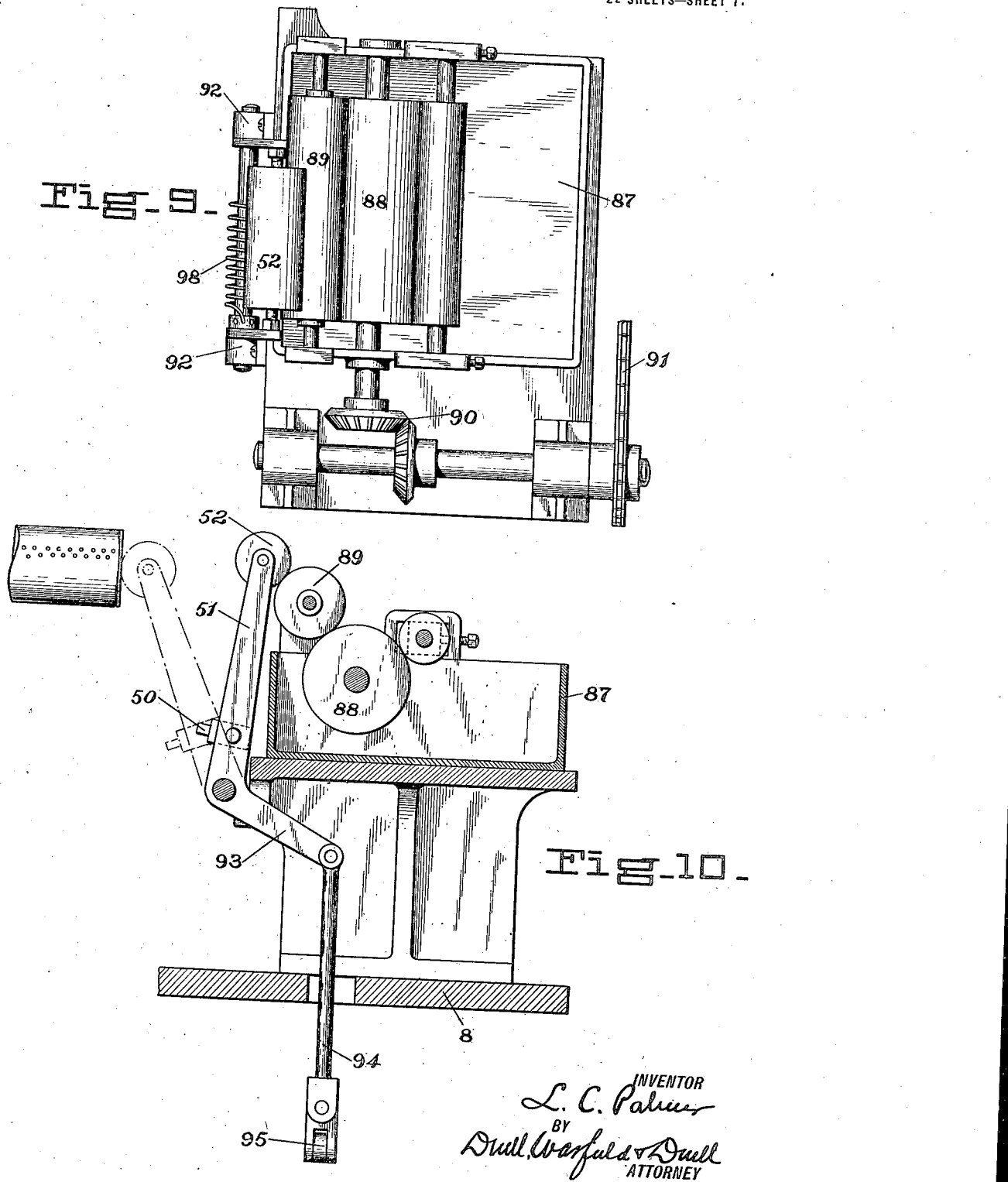

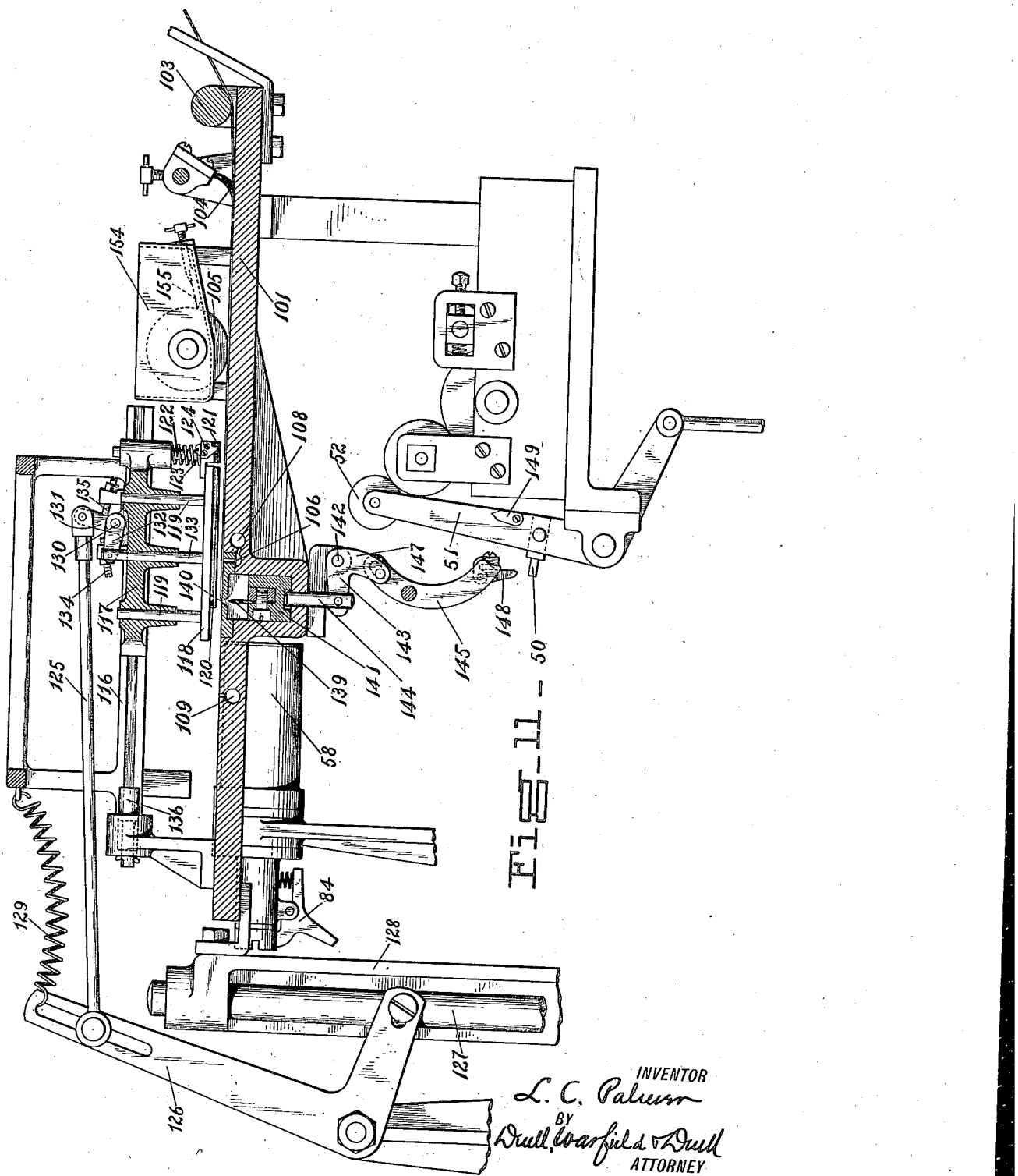

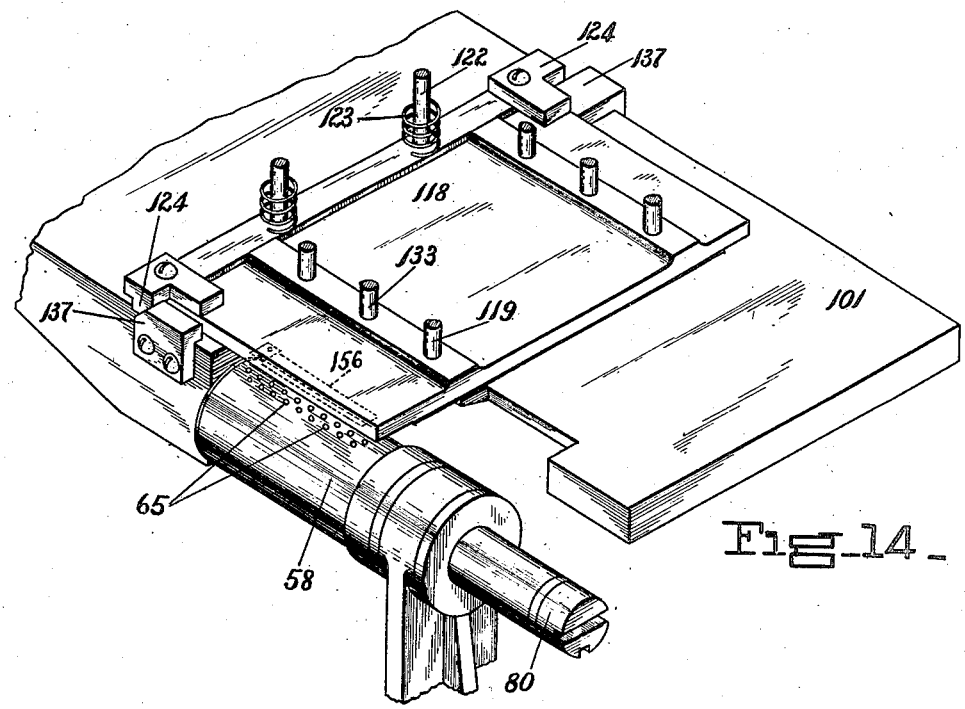
Fig_14_
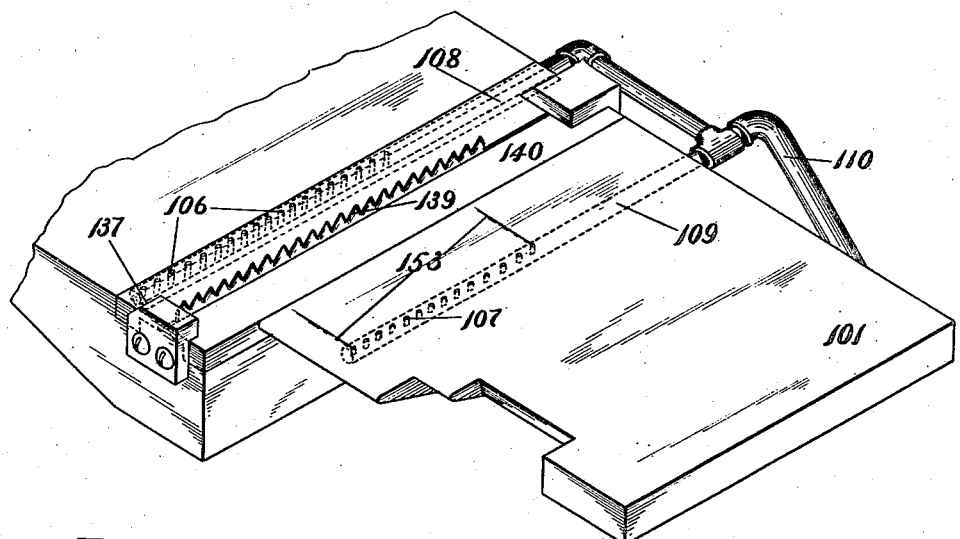
Fig_15_
INVENTOR
L. C. Palmer
BY
Dull, Warfield & Dull
ATTORNEY

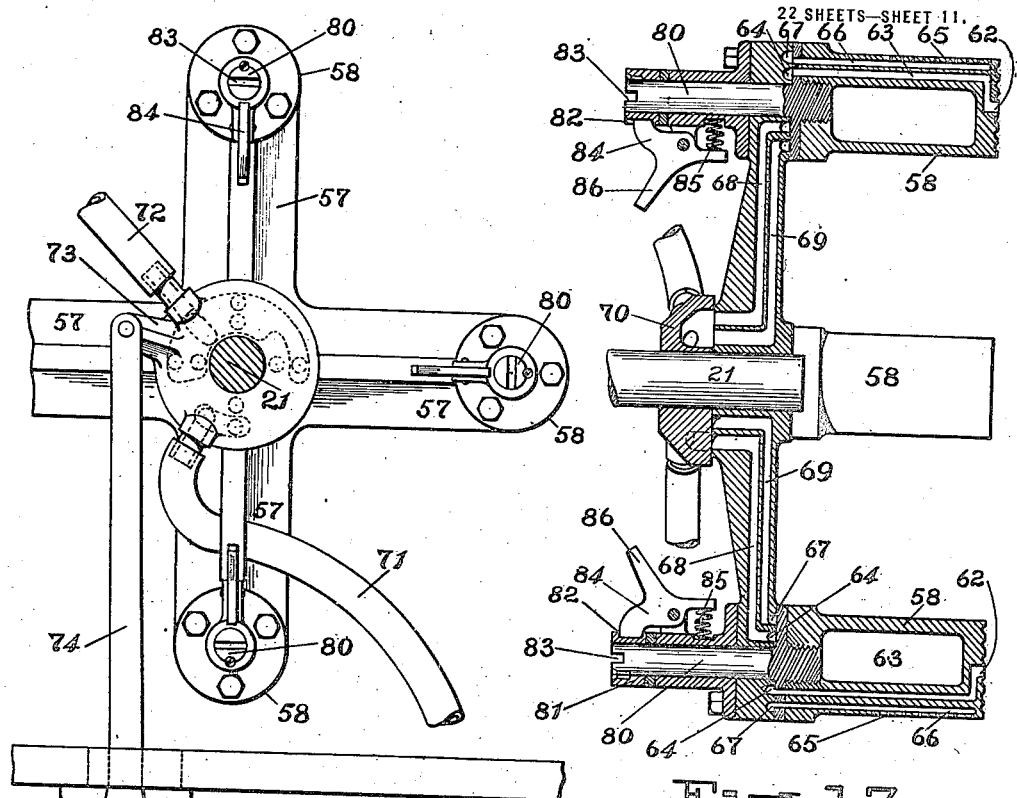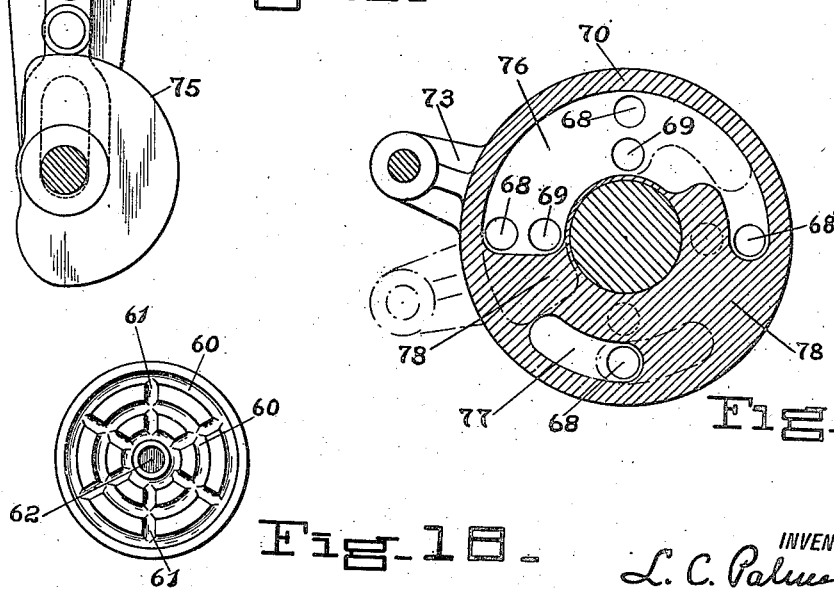

L. C. PALMER.
BOX MAKING MACHINE.
APPLICATION FILED MAY 14, 1918

1,312,570.

Patented Aug. 12, 1919.
22 SHEETS—SHEET 12.

INVENTOR
L. C. Palmer
BY
ATTORNEY

L. C. PALMER.
BOX MAKING MACHINE.
APPLICATION FILED MAY 14, 1918.

1,312,570.

Patented Aug. 12, 1919.
22 SHEETS—SHEET 14.

INVENTOR
L. C. Palmer
BY
Dull, Warfield & Dull
ATTORNEY

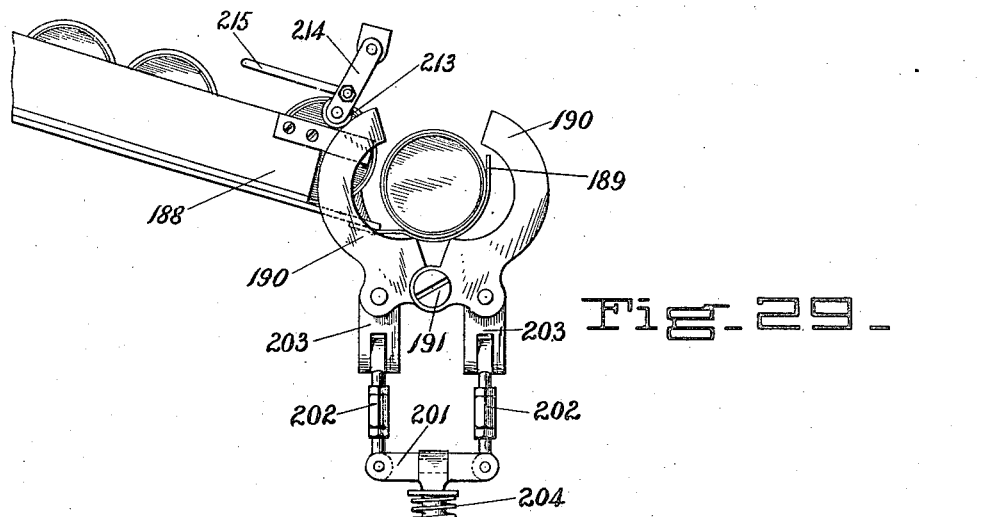
Fig. 29.
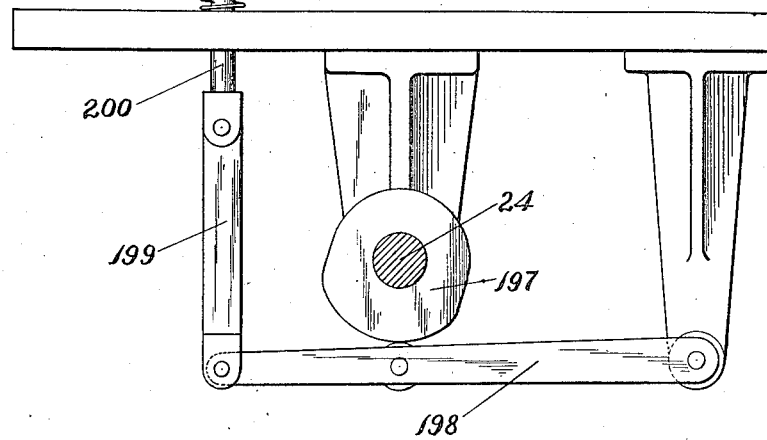
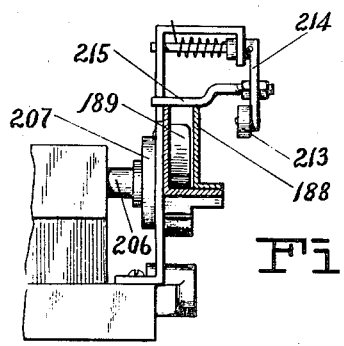
Fig. 30.

L. C. PALMER.
BOX MAKING MACHINE.
APPLICATION FILED MAY 14, 1918

1,312,570.

Patented Aug. 12, 1919.
22 SHEETS—SHEET 16.

INVENTOR
L. C. Palmer
BY
Duell, Warfield & Duell
ATTORNEY

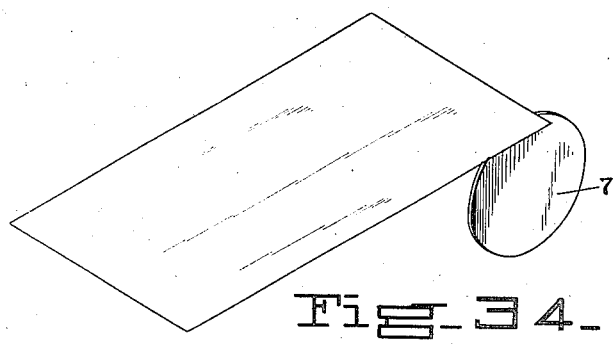
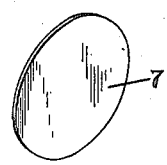
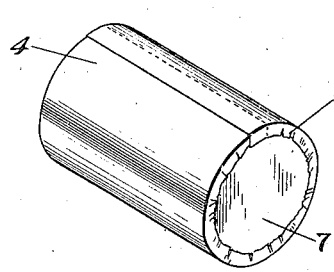
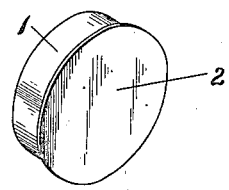
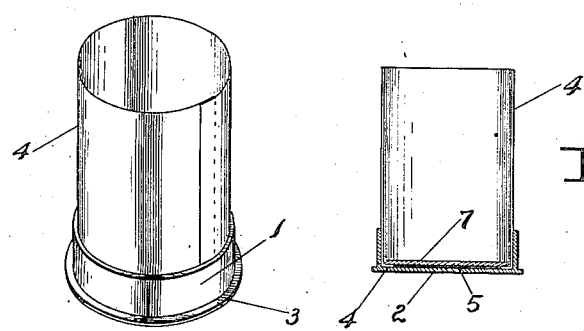

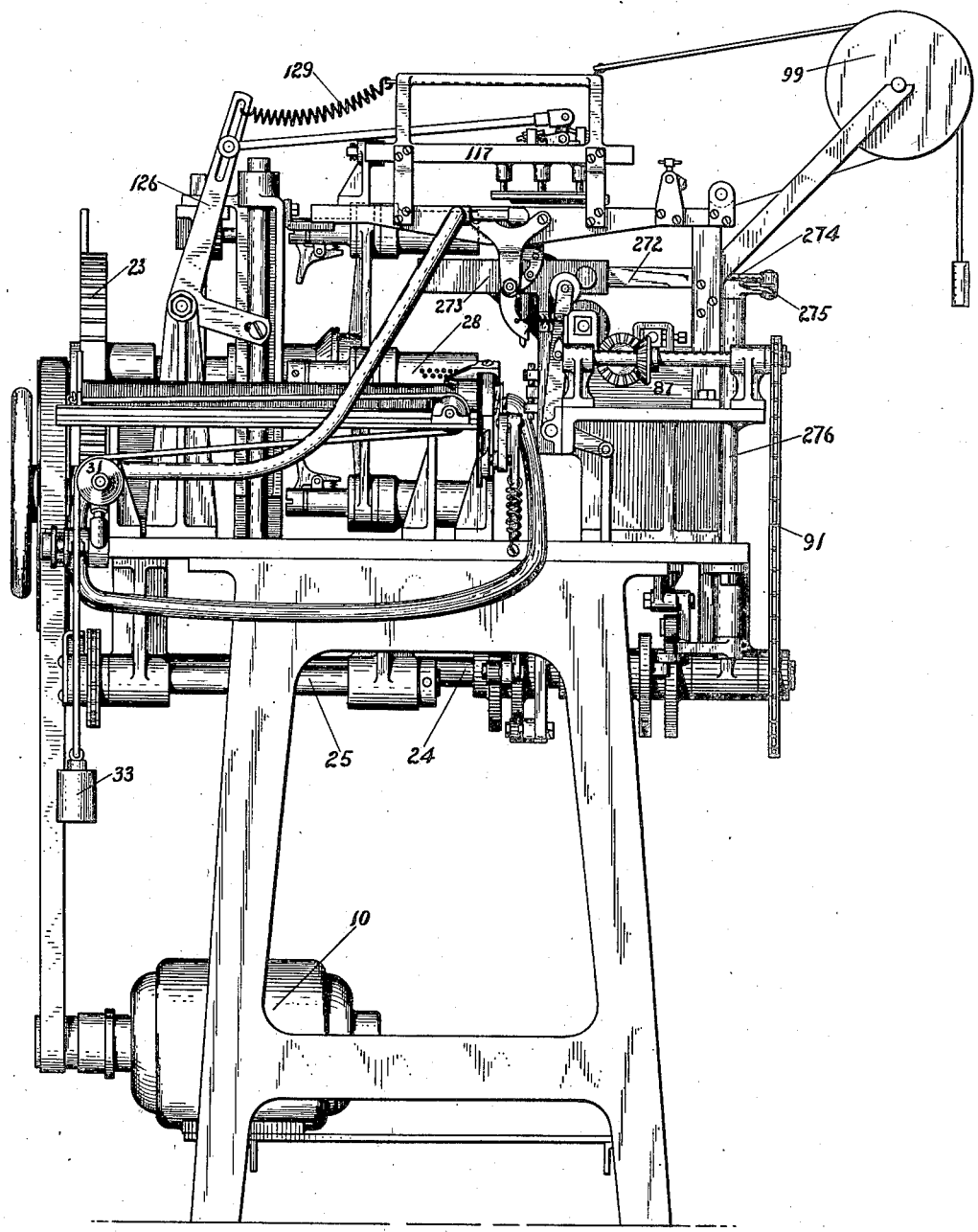

L. C. PALMER.
BOX MAKING MACHINE.
APPLICATION FILED MAY 14, 1918.

1,312,570.

Patented Aug. 12, 1919.
22 SHEETS—SHEET 19.

L. C. PALMER.
BOX MAKING MACHINE.
APPLICATION FILED MAY 14, 1918
1,312,570.
Patented Aug. 12, 1919.
22 SHEETS—SHEET 21.
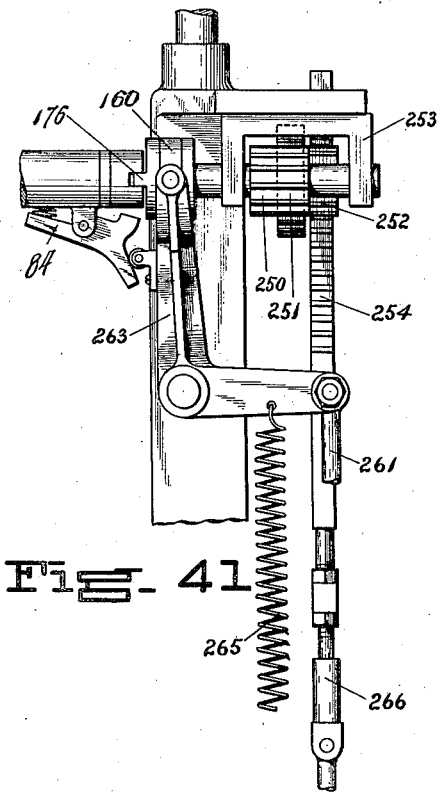
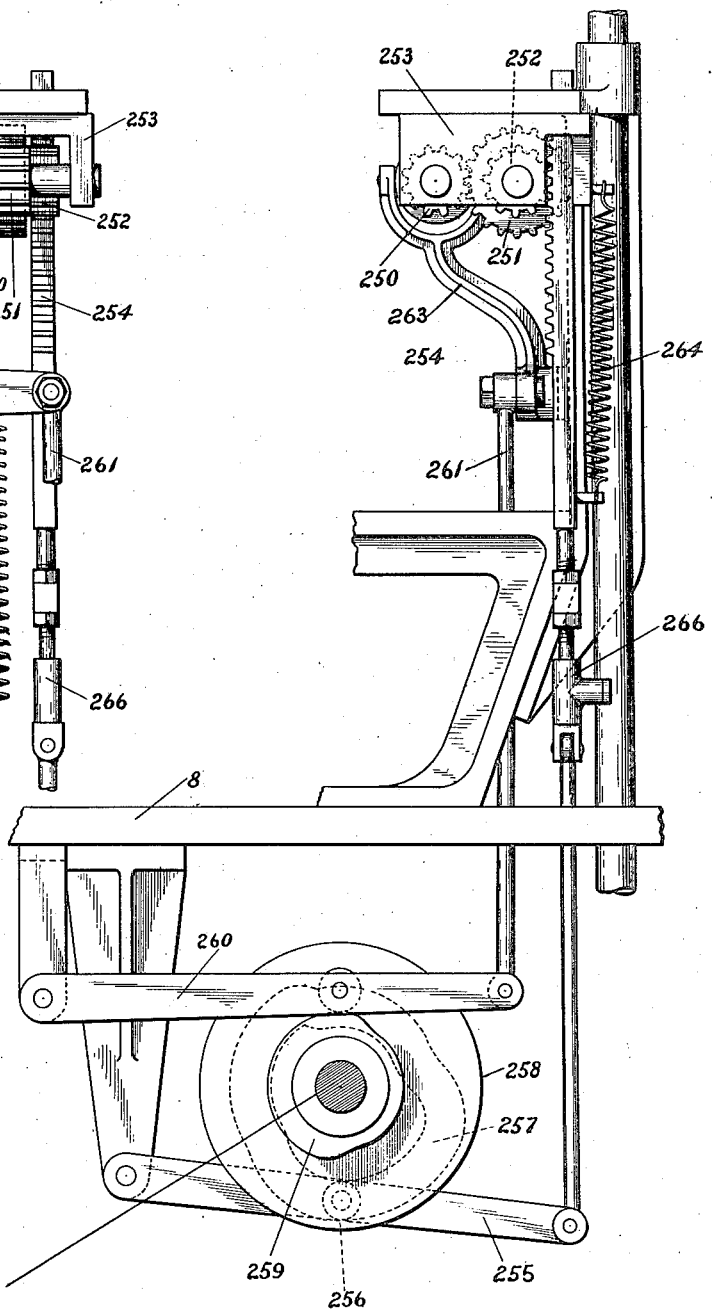

L. C. PALMER.
BOX MAKING MACHINE.
APPLICATION FILED MAY 14, 1918

1,312,570.

Patented Aug. 12, 1919.
22 SHEETS—SHEET 22.

INVENTOR
L. C. Palmer
BY
Duell, Warfield & Duell
ATTORNEY

UNITED STATES PATENT OFFICE.

LYNDON C. PALMER, OF BUFFALO, NEW YORK, ASSIGNOR TO F. N. BURT COMPANY, LIMITED, OF TORONTO, ONTARIO, CANADA, A CORPORATION OF ONTARIO, CANADA.

BOX-MAKING MACHINE.

1,312,570.

Specification of Letters Patent. Patented Aug. 12, 1919.

Application filed May 14, 1918. Serial No. 234,416.

*To all whom it may concern:*

Be it known that I, LYNDON C. PALMER, a citizen of the United States, residing at Buffalo, in the county of Erie and State of New York, have invented certain new and useful Improvements in Box-Making Machines, of which the following is a full, clear, and exact description, such as will enable others skilled in the art to which it appertains to make and use the same.

This invention relates to machines for making boxes, and with respect to its more specific features to machines for making boxes embodying bags designed to more efficiently protect the material contained in the box and to lessen the tendency of powdery material to sift from the box.

One of the objects of the invention is the provision of an efficient automatically operating machine adapted to make a bag.

Another object of the invention is the provision of a practical automatically operating machine adapted to make a bag and associate the same with a box or other container.

Another object of the invention is the provision of efficient, practical and automatically operating means for making the bag sides of thin material, as tissue paper, and associating the bag in proper relation in a box.

Another object of the invention is the provision of practical and efficient paper feeding and controlling mechanism; mechanism especially adapted for automatically operating upon thin paper, as tissue paper.

Another object of the invention is the provision of efficient and practical automatically operable tissue paper cutting mechanism.

Another object of the invention is the provision of practical and efficient automatically operable mechanism for feeding thin disks of paper from a magazine of such disks.

Still another object is the provision of a practical arrangement of mechanism for applying adhesive effectively where required, and so as not to interfere with the operation of the machine or gum up the articles produced.

Another object of the invention is the provision of an efficient means for folding tissue paper and making bags therefrom.

Still another object is the provision of a practical and efficient means for assembling a tissue paper bag with a relatively stiff container in symmetrical relation.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification, wherein similar reference characters refer to similar parts throughout the several views,—

Fig. 9 is a plan view of Fig. 8, and Fig. 10 is a vertical sectional view thereof;

Fig. 11 is a view of certain web feeding and cutting mechanisms employed in the machine as they appear generally in the relation illustrated in Fig. 2, but enlarged and partly in section for clearer disclosure;

Figs. 14 and 15 are perspective detail views of certain portions of the web feeding and web cutting mechanisms;

Fig. 16 is a side elevation of part of the form turret and certain air controlling mechanism associated therewith.

Fig. 17 is a vertical sectional elevation of the form turret;

Fig. 18 is an outer end view of one of the turret forms;

Fig. 19 is a sectional view of the air controlling valve illustrated in Fig. 16;

Fig. 29 is a detail view showing, in open position, a certain centering collar for the box feed;

Fig. 30 is a detail view illustrating the construction of the box feed detent;

Figure 39:
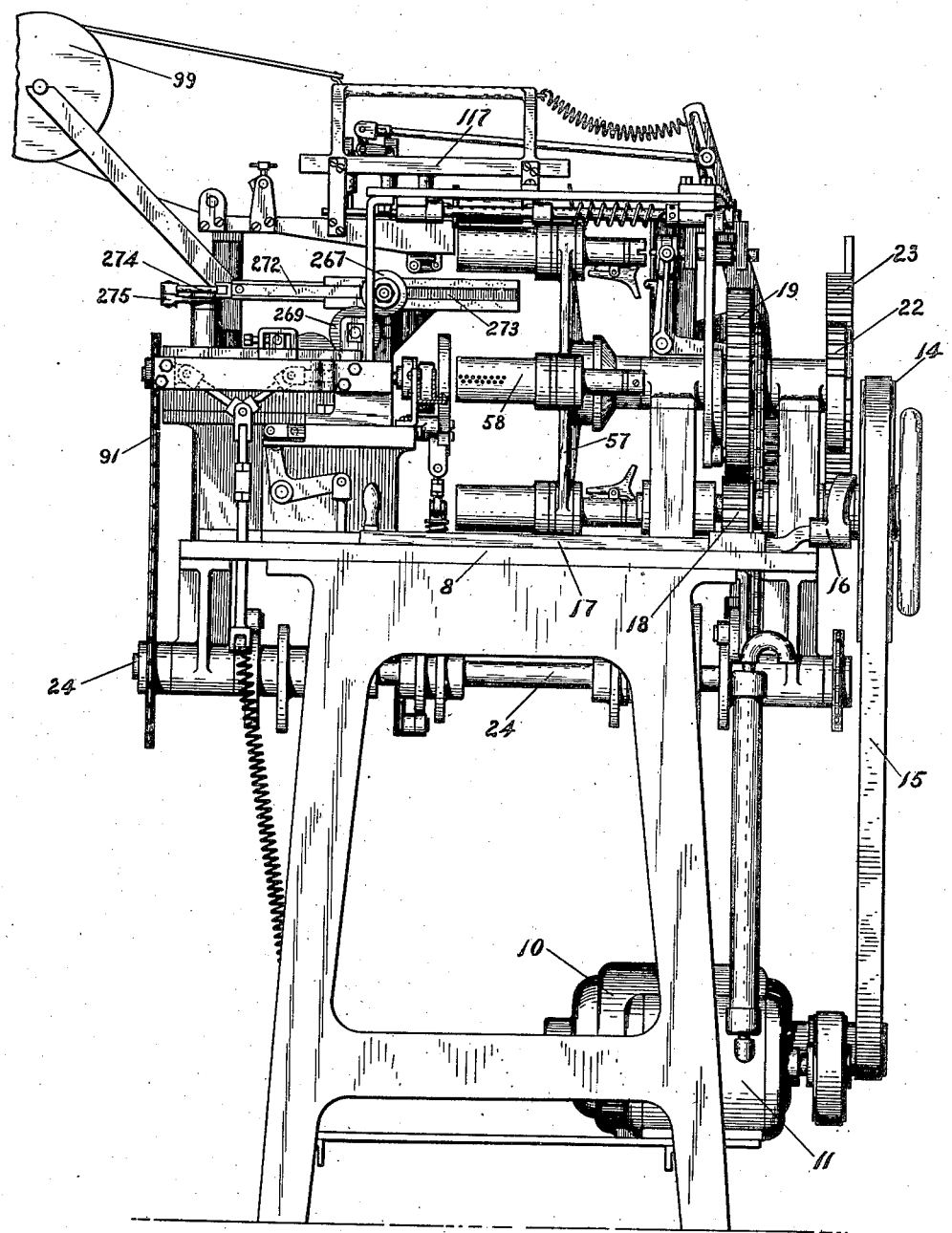
Figure 40:
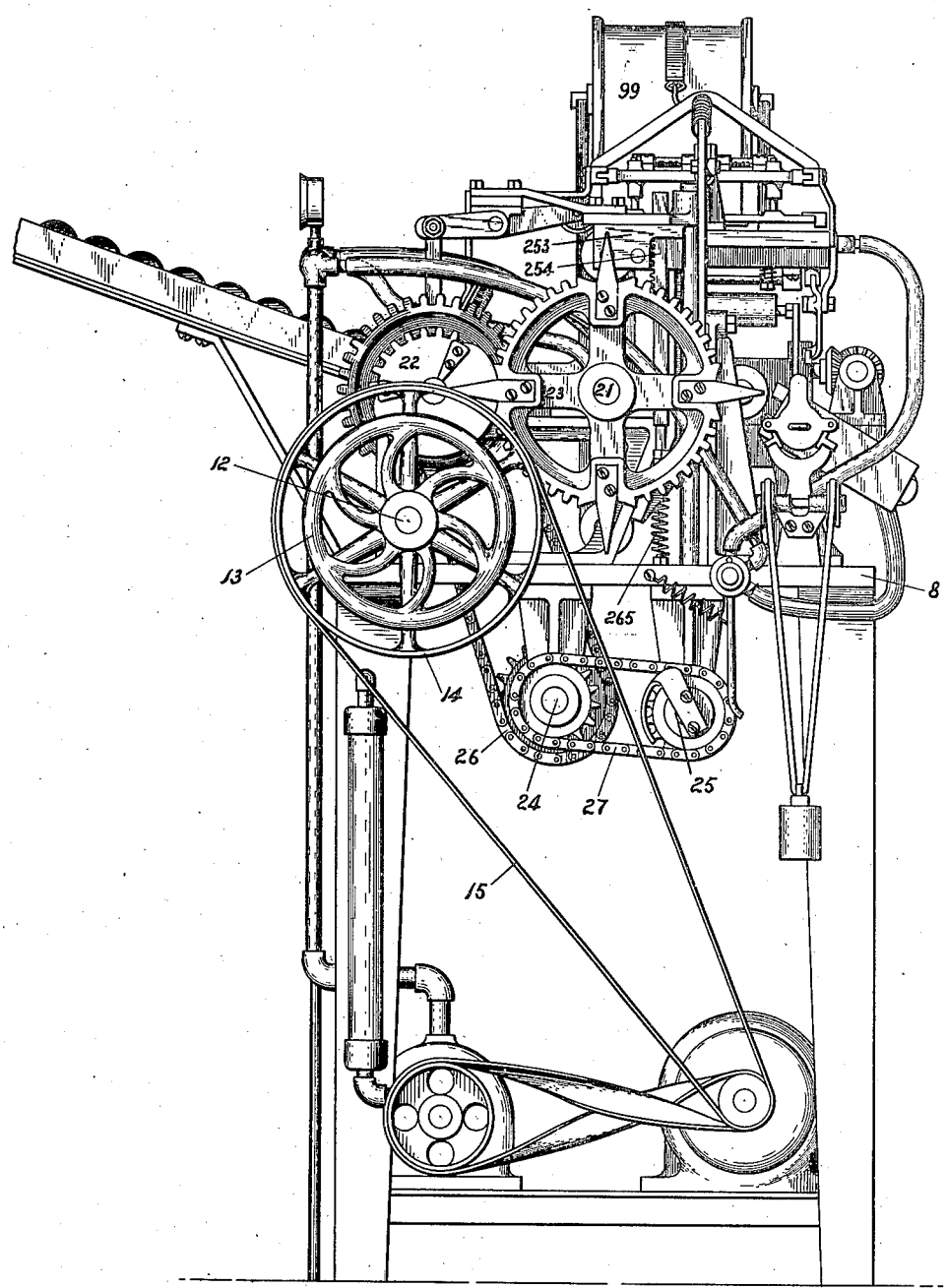
Figure 43:
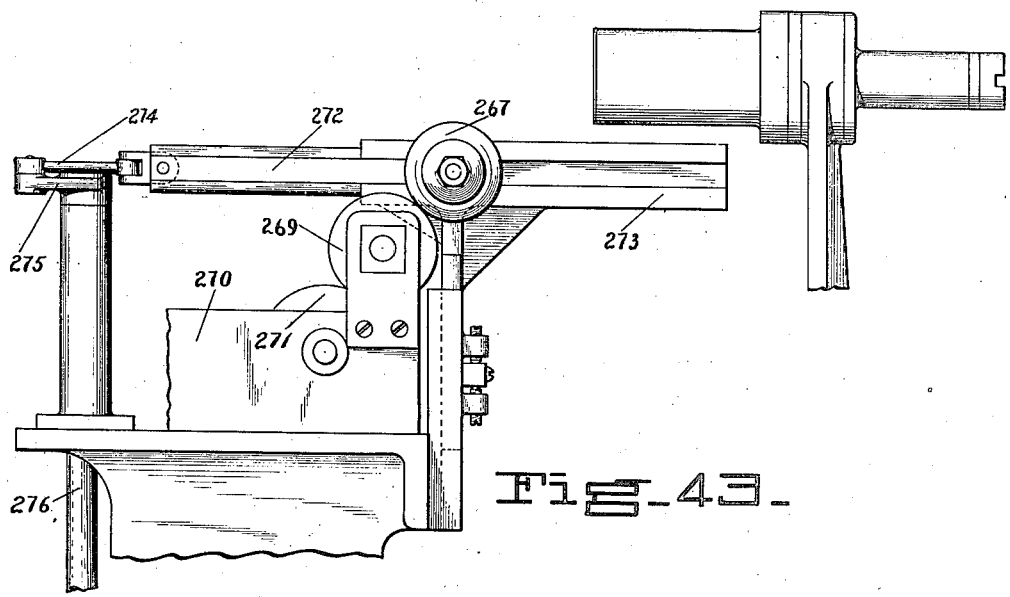
Figure 44:
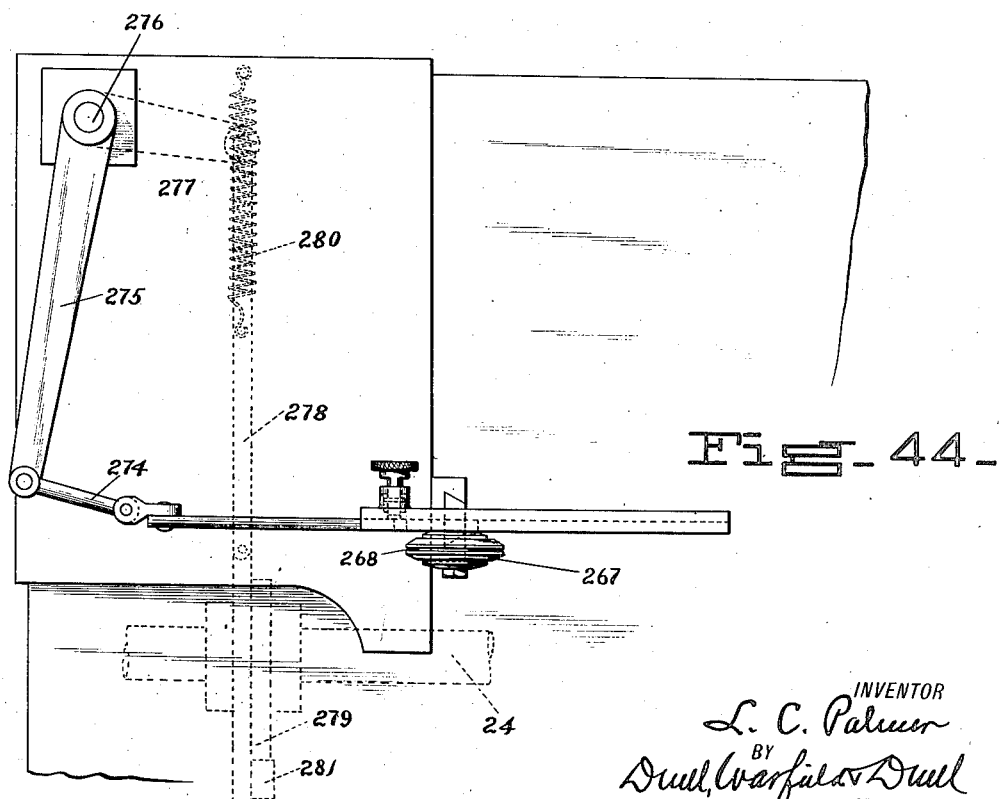

Figs. 33, 34 and 35 diagrammatically illustrate the general sequence of operations in the formation of the associated bag and box;

Fig. 36 is a perspective view of the assembled bag and box produced by the machine;

Fig. 37 is a vertical section through the article of Fig. 36;

Figs. 38, 39 and 40 are, respectively, rear, front, and side elevations of the machine equipped with modified forms of form rotating mechanism and bag sheet gluing mechanism;

Figs. 41 and 42 are elevations of the modified form rotating mechanism viewed at different angles; and Figs. 43 and 44 are, respectively, an elevation anl a plan of the modified bag sheet gluing mechanism.

The disclosure of the invention will probably be facilitated by first generally referring to the construction of the article which is the product of the full operation of the machine. This article is illustrated in Figs. 36 and 37 of the drawings, and comprises a box or container 1, having a head 2, the latter, in the present instance, projecting as at 3. Projecting from the box is the bag, comprising the bag wall or side 4 made of thin material, such as tissue paper, the outer end of which can be folded or twisted so as to close the bag at its outer end. It will be seen that the tissue bag side is in the form of a tube of practically the same diameter as the inner diameter of the box, and it will be further seen that the paper of this tube is folded inwardly as illustrated at 5 in Fig. 35, and lies between the head 2 of the box and the binder or head 7 of the bag. In the manufacture of the article the lower face of the binder 7 is coated throughout its surface with a suitable adhesive, such as glue, and the edges of the tube 4 are folded inwardly, as at 5, these folds being pressed against the glued face of the binder 7 and becoming attached thereto. The tube 4 with the binder or end wall 7 so attached is inserted in the box 1 and then the binder 7 is pressed against the head 2. This causes the binder and head to adhere, it being seen that, in the form shown, the folds 5 do not entirely cover the glued face of the binder 7 but expose a central glued portion which may make contact with the head 2. When the parts are assembled as in Figs. 36 and 37, it will be seen that the thin tissue bagside has its walls spaced apart and nicely symmetrically arranged circumferentially of the flange of the box, the element 7 serving to bind the edges 5 of the tissue shut against the head of the box, and also serving to space the walls of the bag-side apart within the box. The bag-side, when it projects out of the box, may be twisted and folded and pressed into the box, so as to be conveniently concealed and protected by the customary box top, or cover. The invention contemplates the ommission of the bag head 7, where the material of the bag-side is suitable for being glued to the head of the box and retained in place without the assistance of such binder.

Turning now to the machine, there is provided a table 8, having a platform 9 on which may be located an electric motor 10 and a vacuum pump 11 driven from the motor. Mounted on the table 8 in a suitable framework upstanding therefrom is a main driving shaft 12, which may be manually operated by hand wheel 13, and which is driven by pulley 14 and belt 15. A suitable clutch 16 operable by a shift device 17 may be provided to couple the belt pulley 14 with the shaft 12. On the main driving shaft 12 is a main drive gear 18 meshing with a pinion 19 on a counter shaft 20 supported in said framework. The numeral 21 represents a turret shaft also supported in said framework and intermittently driven from shaft 20 through the instrumentality of mutilated gears 22 and 23 suitably designed to give proper intermittent motion to the turret shaft 21 and to hold said shaft 21 at rest between its intervals of motion. Below the table 8 is a main cam shaft 24 and a supplemental cam shaft 25, the main cam shaft being driven from the counter shaft 20 through the instrumentality of a chain 26, and the supplementary cam shaft being driven from the main cam shaft by a chain 27.

Figure 6:
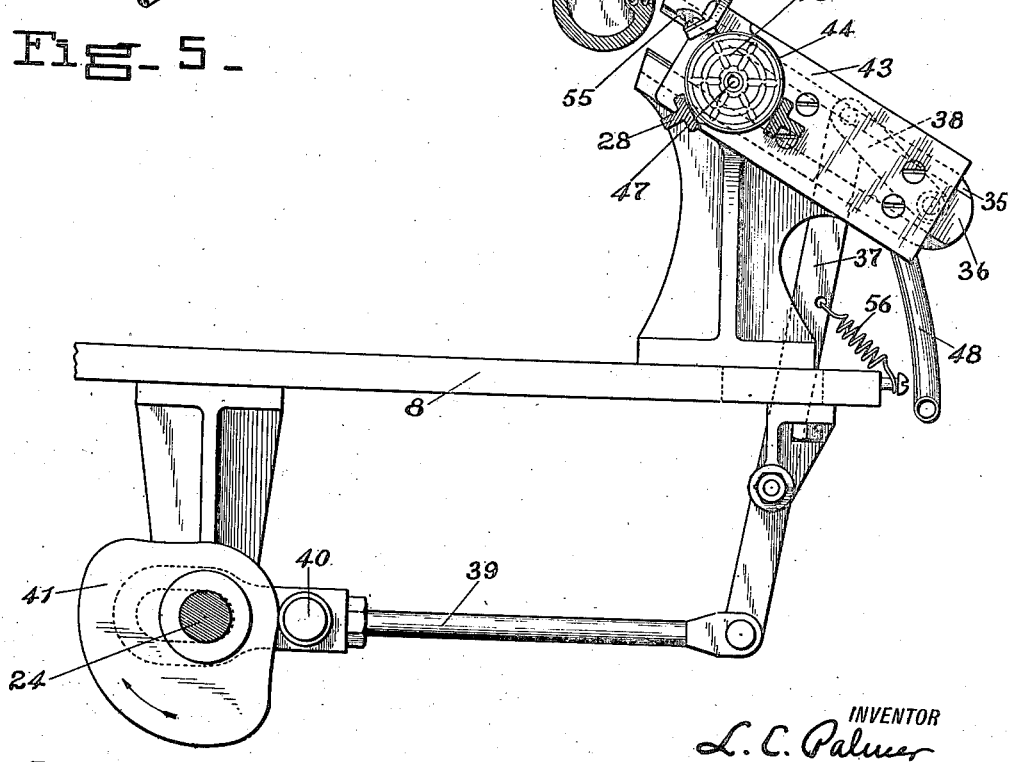
Fig. 6 is a vertical cross-section of Fig. 5.
Figure 7:
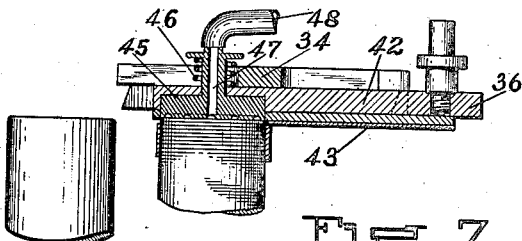
Fig. 7 is a horizontal cross-section of a part of Fig. 6.
Figure 8:
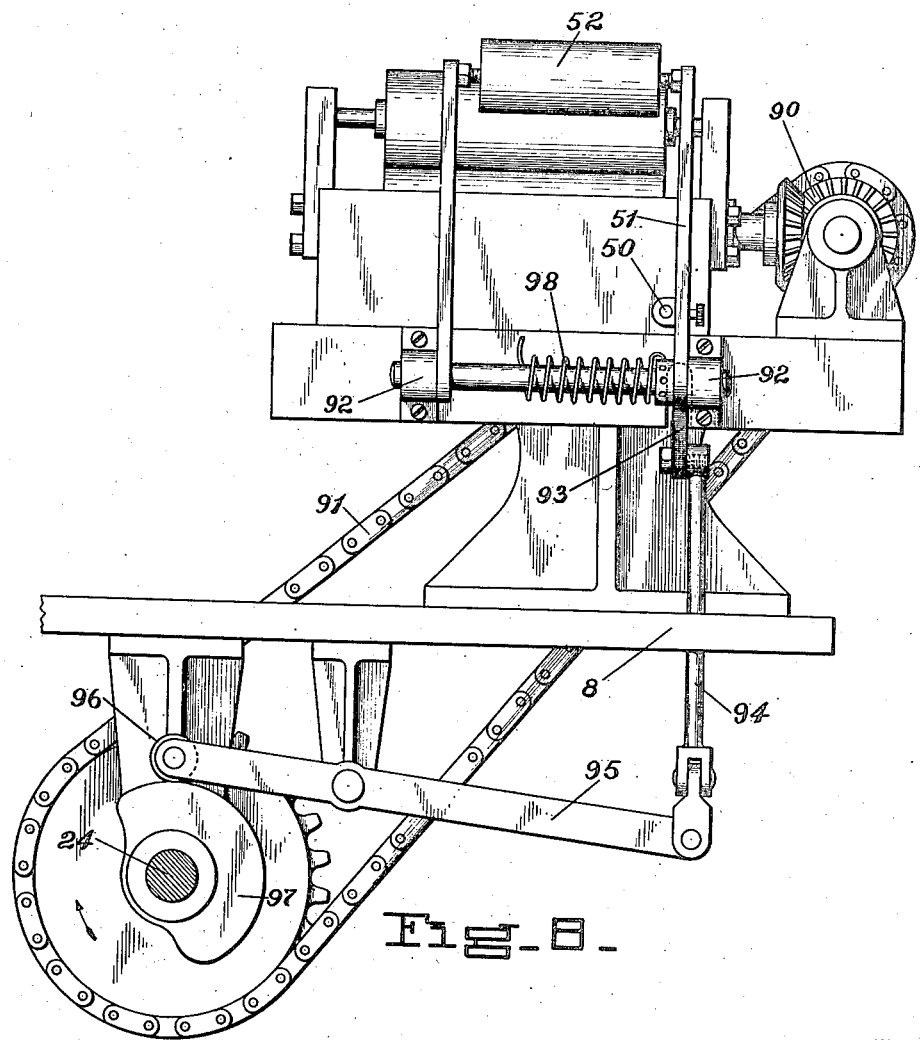
Fig. 8 is a side elevation of a gluing mechanism adapted to apply glue to the binders.

Supported in suitable brackets above the table 8 is a magazine adapted to contain a supply of bag-heads or binders as indicated by the numeral 7, Fig. 37. In the present embodiment these binders are thin pasteboard circular disks, being relatively stiff as compared with the side of the bag, and a pack of such binders rests upon a pair of supports or rods 28, the supporting faces of these rods being inclined downwardly toward each other to center the binders. The pack of heads, or binders, is pressed forwardly in the direction of a reciprocatory binder feed plate by a follower plate 29 also resting upon rods 28 and urged forwardly by cords 30 passing over guide pulleys 31 and 32, a weight 33 being attached to the bight of the cords. From the advance end of the pack the binders are delivered or fed one by one to the forms on the turret which successively present themselves in position to receive the binders. In the present embodiment this head feed mechanism comprises a fixed guide piece 34 having a dovetail slot engaged by a similarly shaped tongue 35 of a feed slide 36. Reciprocatory motion of the feed slide is effected from a rock lever 37 at one end connected to the slide by a link 38, and at the other end connected to a rod 39 having a follower roller 40 coöperating with a cam 41 on the main cam shaft 24. The feed slide 36 comprises a base piece to which is fastened a surfacing plate 42, surmounted by a thin plate 43 cut away as at 44 to provide a shouldered recess comporting with the peripheral shape of a binder disk and of a depth equal to the thickness of a single disk. In the slide 36 is a gripper disk 45 movable transversely of the slide and held to its seat on the slide by a spring 46. The outer face of the disk 45 is constructed with connecting radial and circular recesses, similar to those in the end of the form as, for instance, illustrated in Fig. 18, and the central recess in the face connects with a passageway 47 through the disk 45 to which is connected a flexible pipe 48 which leads to an air controlling valve 49, hereinafter referred to. Valve 49 controls the vacuum for this pneumatic gripper, so that when this gripper disk is opposite the pack of binder disks, the gripper will be energized to retain the foremost binder on the gripper disk. Thereupon the gripped binder will be held closely against the feed slide during the feed movement of the latter, and when the binder has been advanced to position closely adjacent and opposite the form, the grip will be released. The yield of the gripper disk 45 is desirable when the conditions are such as to require the disk to move toward the pack to grasp the foremost binder. Such movement may be effected by a projection or screw 50 (Fig. 10) on a rock lever 51 carrying a glue roller 52, as hereinafter referred to. The lever 51 moves toward the disk 45, and the device 50 strikes the stem of the disk 45 and moves it toward the pack of binders in the magazine. Fastened to the fixed plate 34 is a bracket 53 which overhangs the forward end of the pack of binders and carries a tubular guide 54 through which the binders pass. A spring 55 on the bracket 53 is disposed between the magazine and the form to which the binder is to be fed. One of the forms having assumed position to receive a binder from the magazine, as for instance illustrated in Fig. 6, the cam 41 will cause the feed slide to move positively across the end of the magazine transversely of the rods 28 toward the form, and on this movement the end binder in the magazine, being pneumatically gripped to the disk 46, will be carried into position opposite the end of the form, the movement being assured by the plate 43. The rear portion of the slide will close the delivery end of the magazine so as to prevent the disks from being thrust therefrom until the feed slide returns into position to receive a succeeding disk. The return of the feed slide is effected by a spring 56. As the slide advances, the head or binder may wipe against the spring 55 and thus be alined with the form, the spring assuring that the binder will be retained on the slide and that the edge of the binder may pass the corner of the form.

On shaft 21 is fixed the rotatable turret consisting, in the present instance, of four arms 57 (Figs. 16, 17, 18), each arm carrying a bag support, in the present instance a form 58. In the present embodiment the forms are cylindrical in shape and are alike in construction and operation. Each has a generally flat outer end 59 having a series of concentric depressions or recesses 60 joined by cross recesses 61 and having communication with a central air opening 62 which terminates a passageway 63 in the form, the other end of the passageway 63 communicating with an annular recess 64 in the turret arm. The recesses 60 and 61 and the central opening 62 are adapted to operate as pneumatic grippers to attach the binders to the ends of the forms. In the cylindrical surface of each form is a line of air openings 65 adapted to serve as pneumatic grippers for the bag sheets, and communicating with a passageway 66 closed at its outer end and at its inner end communicating with a second annular passageway 67 in the turret arm. The annular passageways 64 and 67 in turn communicate with separate air passageways 68 and 69 in the turret arms, and the passage of air through the passageways 68 and 69 is controlled by a valve 70 of an air control device (Figs. 17 and 19), there being two pipes 71 and 72 communicating with the interior of the valve 70 in such manner that at certain times a partial vacuum may be established through the passageway 63, and at other times compressed air may be driven therethrough, and so that at certain times a partial vacuum may be established in the passageway 66, and at other times normal pressure in said passageway be restored. The valve 70 comprises a chambered member mounted for oscillatory movement on the turret shaft 21 and the turret is intermittently rotated through the instrumentality of the mutilated gears 22 and 23 hereinbefore refered to. The fitting of the valve 70 to the coöperative face of the turret hub is such that when the turret moves in one direction the valve will rotate therewith by friction, movement of the valve in the opposite direction being effected through the instrumentality of the crank arm 73, connecting rod 74, and cam 75. The intermittent rotation of the turret translates the forms in an endless path to four stations at which different operations are performed, as will appear.

In Fig. 19 is shown a section of the air valve at the hub of the turret, with the ports in the hub of the turret leading to the openings 65 in the side of the form and to the opening 61 in the end of the form. The parts are in the position corresponding to those occupied by the forms when at rest at the four stations. The valve 70 is hollow and divided into two chambers 76 and 77 by the partition 78, the vacuum pipe 72 leading to chamber 76 and the compressed air pipe 71 leading to chamber 77 from a source of compressed air, as the pipe 79, Fig. 1. The inner face of the partition controls the passage of air through the passageways 68 and 69, by covering or uncovering said passageways. It will be seen that in the position illustrated in Fig. 19, the vacuum is on to effect grip on the binders at the binder receiving station through the recesses 60, 61 and 62, the bag sheet receiving station and the box receiving station. At the discharging station compressed air is delivered to the port 62 in the end of the former, so as to relieve the grip and discharge the article. As the form moves from the binder receiving station to the bag sheet receiving station, the valve 70 rotates so as to avoid uncovering the port 69 leading to the bag sheet gripper openings 65 until the next station has been practically reached, whereupon the valve 70 rotates in the opposite direction to its orginal position; so that at the second station both ports will be open to the vacuum in chamber 76, and will continue open to and beyond the third station. Before reaching the fourth or ejecting station the port 68 connects with the pressure chamber 77 and compressed air will be forced through port 62 of the form to eject the article. When the vacuum is cut off from the passage 66 the leakage is sufficient to relieve the pneumatic grip on the bag sheet; furthermore the paper is tissue and readily penetrated by air.

Each form 58 is secured to a stem 80 rotatably mounted in the turret arm. On the outer end of each form stem is removably fixed a collar 81 having in its lateral face a recess 82 and in its end face a clutch element recess 83. Pivotally mounted in the bearings of each of the form stems 80 are form locking members comprising pivoted pawls 84, the teeth of which are urged into the recesses 82 by springs 85, the pawls being provided with arms 86 for readily disengaging the teeth from the recesses 82. The province of the pawl 84 is to lock the form 58 in a predetermined rotary position, removal of the pawl from the locking engagement permitting rotation of the form relative to the turret.

Returning now to the feeding of the binder or head—when it has been placed in position opposite the end face of the form, the valve 70 will operate and a partial vacuum be established in the passageway 63 so that the binder will be pneumatically gripped and held upon the end of the form, the grip on the feed disk 46 having been relieved. The binder feed slide will then be retracted to feed a succeeding binder to the next form.

It will be perceived that in the present embodiment the binder magazine is disposed at the rear of the machine and only slightly below the turret shaft 21 so that the station at which the form receives the binder is at the rear and intermediate an upper and a lower station. After a binder has been pneumatically gripped to the form, the binder carrying form is rotated upwardly 90 degrees and thereby brought to the next station where a bag sheet, or side, is to be applied and folded. As the form carrying the binder moves upwardly, as stated, glue is applied to the exposed face of the binder by a glue transfer roller 52 (Fig. 10). On the table 8 is supported a glue tank 87 having a roller 88 dipping into the glue in the tank and transferring glue to a second roller 89 with which the glue transfer roller 52 moves into and out of contact. The roller 88 is driven through the miter gear 90 by means of a chain 91 driven from the main cam shaft 24. The glue transfer roller 52 is rotatably mounted between the arms of a yoke oscillatively supported in bearings 92 and having an arm 93 connected by a link 94 with one end of a rock lever 95, the opposite end of said lever having roller 96 which coöperates with a cam 97 on the main cam shaft 24. The disposition is such that the cam 97 positively rocks the yoke so as to cause the roller 52 to move toward the glue roller 89, motion of the glue transfer roller toward the path of the binder on the form being effected by coil spring 98, the tension of which is adjustable. The timing of the operation of the roller 52 is such that as the form carrying the binder moves from the binder receiving position to the next station, the spring 98 moves the roller 52 into such position that the outer face of the binder, or head, wipes over the roller 52 and becomes coated with glue. Inasmuch as the movements of the binder and the roller 52 are in the arcs of intersecting circles, the roller should be of sufficient length to completely coat the binder. Having arrived at the upper station, and being coated with the adhesive, the binder is in condition to have the bag sheet associated therewith in accordance with the present embodiment.

Figure 1:
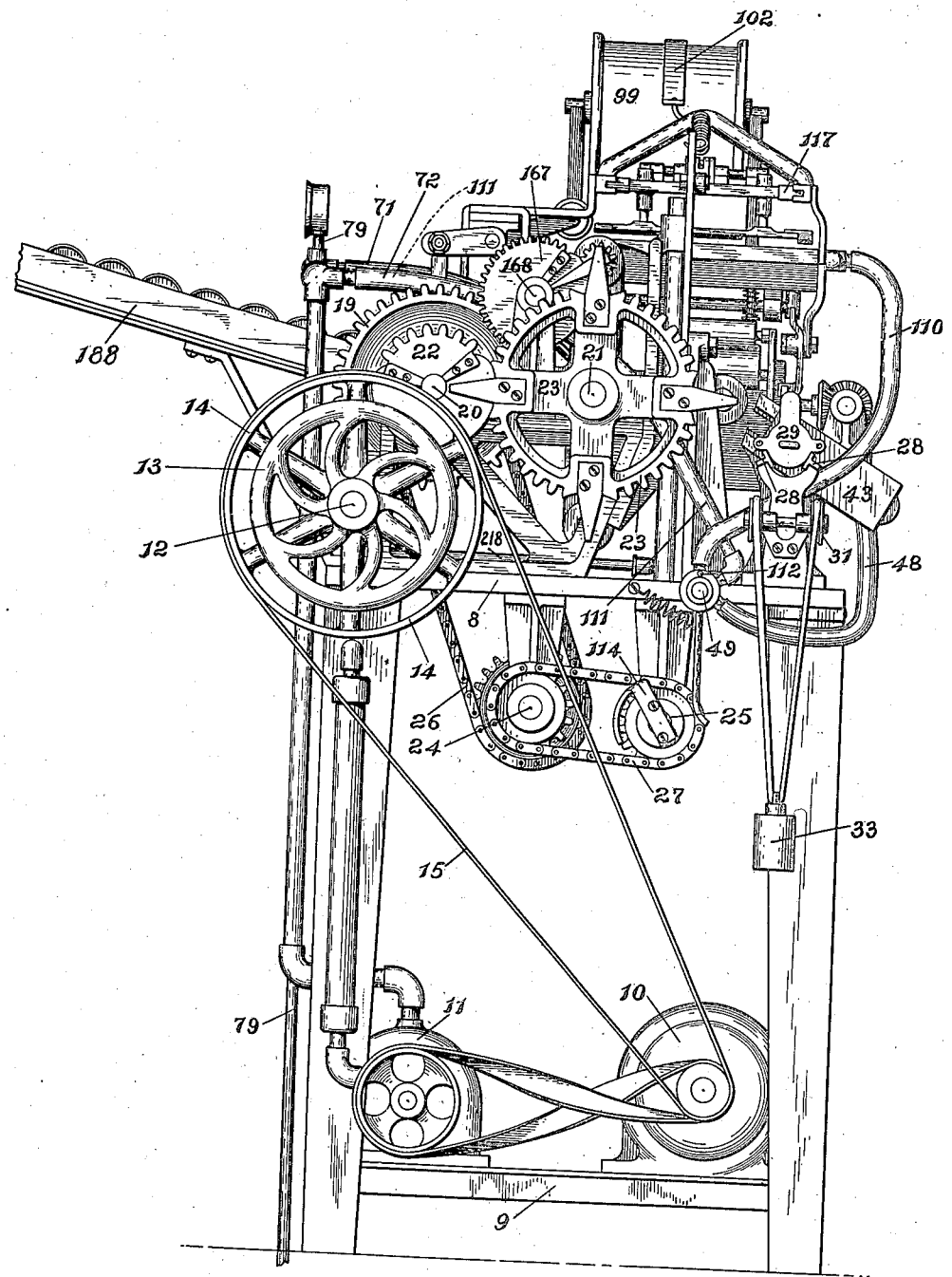
Figure 1 is a side elevation of a machine embodying the invention.
Figure 2:
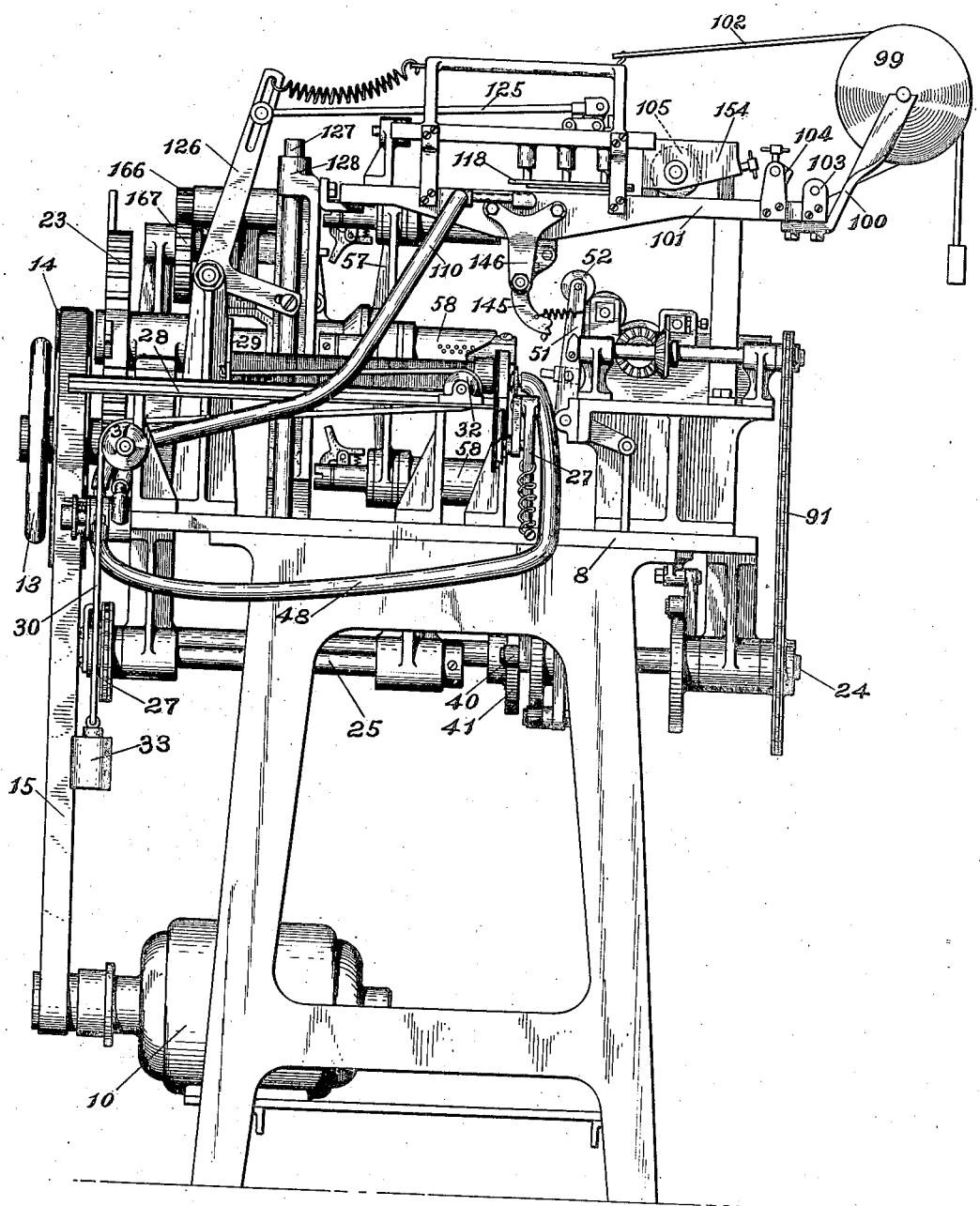
Figs. 2 and 3 are rear and front elevations respectively of the machine.
Figures 21, 22:
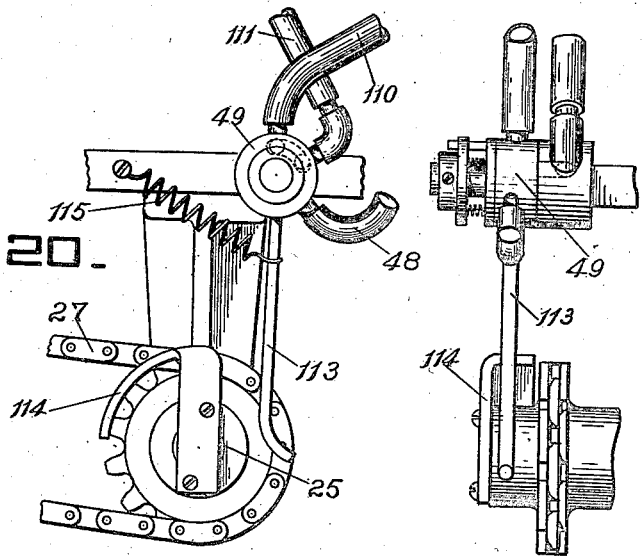
Figs. 21 and 22 are side and end views respectively of an air valve and its operating devices adapted to control the tissue paper web and the bag side sheets, or blanks.

The material of which the sides of the bags are to be formed may be supplied in separate sheets, each of a size to provide for a single bag, or they may be supplied in web form to be cut by the machine into sheets of the required size. In the present embodiment the material is supplied in the web form and the numeral 99 indicates a roll of material, in the present instance a roll of tissue paper supported on brackets 100 projecting upwardly from a paper feeding, supporting and positioning table 101 disposed above the main table 8 opposite the path of the forms. A strap brake 102 may be employed to slightly oppose the feed of the paper and prevent overrunning. From the roll 99 the tissue web passes beneath a guide bar 103, thence beneath a brush 104, the tension of which may be adjusted, as illustrated, and thence beneath a narrow glue roller 105 above the paper feed table 101. At certain positions longitudinally of the feed of the paper web lines of pneumatic gripper openings 106 and 107 in the table communicate with passageways 108 and 109 (Fig. 15) in turn communicating through a pipe 110 with an air valve 49 (Figs. 21 and 22), which latter controls the passage of air through the openings 106 and 107 so that a partial vacuum may be established in the passageways and cause a gripping of the paper to the paper feed table at predetermined times. From the valve 49 a vacuum pipe 111 leads to the pump 11. The valve 49 may be rotated in one direction to establish communication between the pipes 110 and 111, and in the opposite direction to cut off communication therebetween and connect pipe 110 with the atmosphere through opening 112 (Fig. 1). This valve is moved by an arm 113 operated in one direction by a cam 114 on supplementary cam shaft 25, and in the opposite direction by a spring 115. By operating the valve 49, the gripping effect of the openings 106 and 107 may be controlled.

Figure 12:
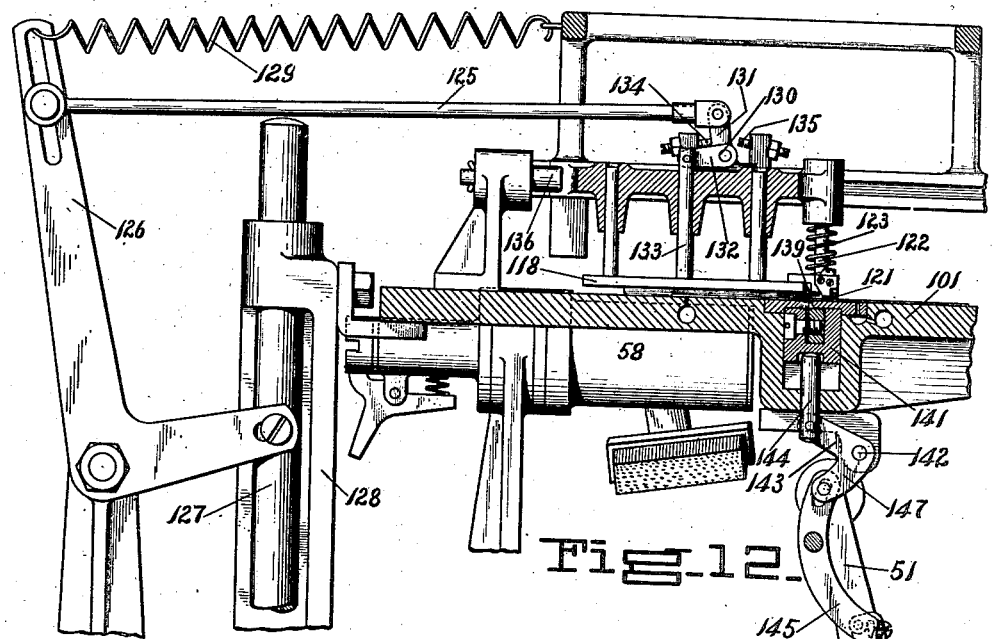
Fig. 12 is a view of a portion of the mechanism shown in Fig. 11 with the parts in a different position.
Figure 13:
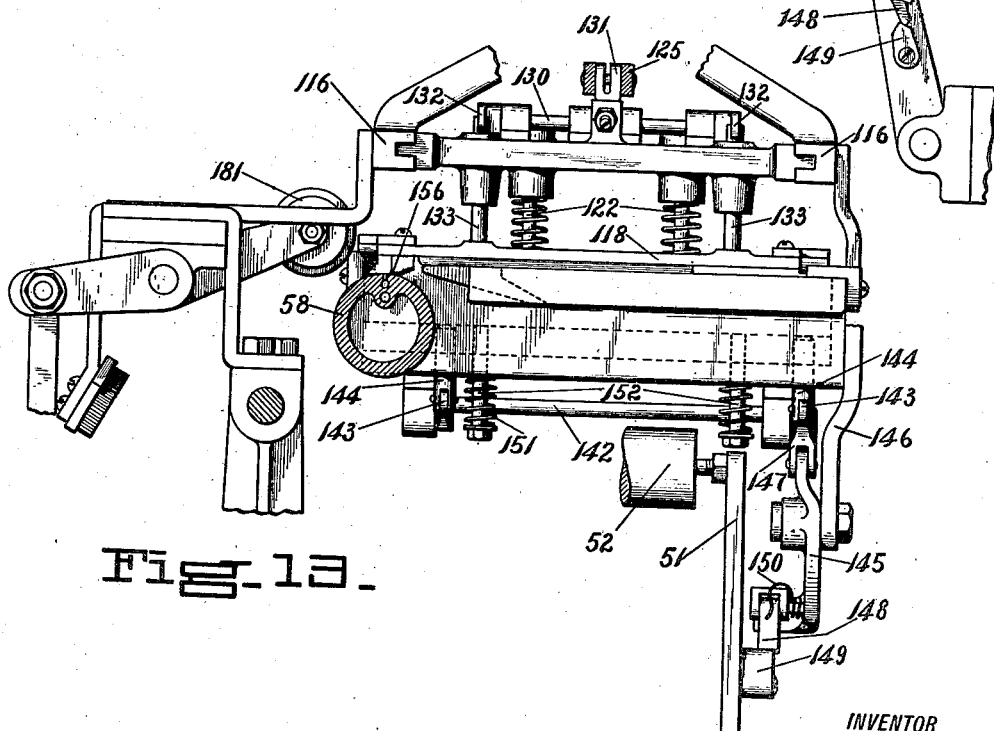
Fig. 13 is a cross-sectional view of a portion of Fig. 12.
Figure 20:
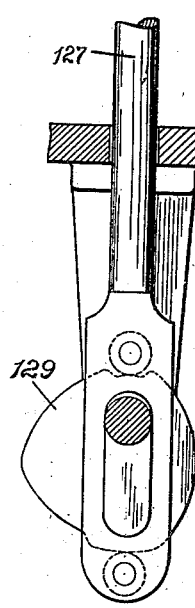
Fig. 20 is a view showing the construction of the cam and adjacent connections to operate the paper web feed device.

Located above the paper feed table 101 are guides 116 in which the tissue web feeding device, in the present embodiment comprising a friction drag carriage 117, reciprocates longitudinally of the table. This carriage comprises an upper or body portion which supports a plate 118, said plate being vertically movable relative to the body portion, and guided by pins 119. The under face of the plate 118 is such that when it rests upon the tissue web, and is moved in a direction to feed such web, the friction is such that the tissue web will be dragged along the surface of the paper table 101 and thus fed from the supply roll. A suitable friction surface may be provided by coating the lower face of the plate 118 with soft rubber, as shown at 120. The plate 118 is made in two parts, a main relatively long part, and a supplementary relatively short part, as illustrated at 121. The supplementary part is designed to be raised by the main part but may be lifted independently of the main part, and to this end it is supported on certain guide pins 122 passing through the body of the carriage, the descent of the supplementary part being assisted by springs 123. Certain cam pieces 124 are provided on the supplementary part for a purpose which will hereinafter appear. The raising and lowering of the friction drag plate 118 into and out of coöperation with the web is mainly effected through the instrumentality of a connecting rod 125 adjustably connected to a rock lever 126 operatively pivotally connected to a vertical reciprocating rod 127 supported in an upstanding frame piece 128 on the table, the rod 127 extending through an opening in the table (Fig. 20) and coöperating with a cam 129 on the supplementary cam shaft 25. Pivoted on the upper portion of the body of the paper feed carriage is a horizontal rock shaft 130 to an arm 131 of which the connecting rod 125 is pivoted. At each end of the rock shaft 130 is an arm 132 suitably pivotally connected to pieces 133 fixed to the drag plate 118. In the path of rocking movement of the arm 131 are adjustable stops 134 and 135. The numeral 136 indicates a stop in the path of movement of the paper feeding carriage. In operation, and referring to Fig. 12, the cam 129 causes the rod 125 to move to the right until it is brought up against the stop 135. In this wise the drag plate 118 will be lifted from the paper feeding table 101. Further movement of the rod 125 to the right will cause the carriage and drag plate to move to the right until it shall have assumed the position of initial feeding, as shown generally in Fig. 11, whereupon the connecting rod 125 will move to the left. The initial movement to the left will rotate the shaft 130 and lower the plate 118 against the paper to be fed and the amount of pressure on the paper may be regulated by the stop 134. Having descended on the paper, further movement of the rod 125 to the left will result in the advance of the carriage and the consequent feed of the paper, the drag plate coöperating frictionally with the paper to feed the same. It will be understood that the upper face of the table 101 should be quite smooth so as to permit the paper to slide readily thereover. In the path of the cam pieces 124 on the supplementary part of the plate 118 are fixed cams 137 (Fig. 15), and as the carriage is moved past the cams 137 the supplementary part of the drag plate will be lifted from the paper and will remain out of contact therewith until recession of the drag plate. Between the main and supplementary parts of the drag plate a space is provided which is for the purpose of receiving a web cutter which operates to sever a blank or bag sheet from the web. In the present embodiment the feeding movement of the carriage is divided into two parts. It first moves sufficiently to feed the amount of web which is to be cut off; it remains at rest and in contact with the paper during the cutting operation, and it then makes a further feeding movement which advances the severed blank, or bag sheet, into certain predetermined relation relative to the form 58 around which it is to be fed. Both the main and supplemental portions of the feed plate remain in contact with the paper while it is being cut, but upon the movement of the plate to effect the feeding of the severed bag sheet, the supplementary part 124 is raised by the cams 137 so as to avoid further feed of the web. If reference be made to Fig. 20, it will be seen that the cam 129 is so constructed as to positively move the paper feed carriage in each direction, and it will be observed that in the position shown the upper cam roller occupies a recess. This recess corresponds to the position of the carriage at the beginning of its feeding movement.

The web having been fed the predetermined amount required, a blank or bag sheet is severed therefrom by the reciprocatory cutter 139 (Figs. 11 and 15) operating transversely of the web. The teeth of this cutter are sharp on their upper ends as well as on their sides, and the points of the teeth readily pierce, or penetrate, the soft tissue. This cutter operates through a slot 140 in the table. The blade of the cutter is removably fastened in a vertically reciprocatory block 141 by a screw and clamp plate, as illustrated, the block being guided and housed by a portion of the frame. Beneath the housing is a rock shaft 142, each end of which carries an arm 143 coupled to vertically reciprocating pins 144 which, on the upward movement, force the knife through the slot 140 and the paper opposite thereto. The shaft 142 is operated by a lever 145 fulcrumed on a bracket 146 depending from the paper feed table, one arm of which lever has a pin and slot connection with an arm 147 on the shaft 142. The other arm of the lever 145 is provided with a trip pawl 148 freely movable in one direction (to the left in Fig. 11) and abutting a stop on the arm in the opposite direction. The actual operation of the trip pawl is effected by a cam 149 (Fig. 12) on one of the arms of the yoke 51 which carries the glue transfer roller 52. As the glue roller 52 advances to apply glue to the binder on the end of the form, the cam 149 wipes freely past the pawl 148, the latter turning freely on the arm 145. As the glue roller returns the cam 149 comes into contact with the pawl 148 from the opposite direction and effects a sudden movement of the cutter upwardly so as to sever the paper. A suitable spring 150 is provided to yieldingly maintain the pawl 148 against the stop on the arm 145. The lowering of the cutter may be assisted or effected by springs 151 surrounding pins 152 attached to the cutter block 141, these springs at their upper ends abutting the housing, and at their lower ends coöperating with heads or ends on the pins 152.

The coöperative operations of feeding and cutting are as follows:

The paper is fed by the drag plate and the relative construction is such that the feed of the web the proper amount brings the space between the main and supplementary drag plates opposite the cutter slot in the feed table. The web feed then ceases and both the main and supplementary plates remain on the web. While in this position the cutter is projected upwardly to sever the paper and then descends. Thereupon the feed carriage further advances, but the supplementary feed plate 124 is immediately lifted from the paper so as not to effect further feeding of the web. This further feeding, in the present embodiment, is confined entirely to the bag sheet or blank which has been severed from the web.

During the main feed of the web, the pneumatic grippers 106 and 107 are preferably not energized. There is therefore no resistance to the feed movement of the paper due thereto. When the feed movement ceases, to allow the cutting to take place, a partial vacuum is established in the passageways leading to the openings 106 and 107, and the effect is to cause the web to be pneumatically gripped to the table along the lines of the respective openings. Consequently when the supplemental portion of the feed plate lifts, the pneumatic grip due to the openings 106 serves to keep the end of the web in proper position on the table, and when the main portion of the feed plate lifts preliminarily to the return of the feed carriage, the pneumatic grip due to the openings 107 serves to yieldingly retain the separated bag sheet in predetermined position on the table in coöperative relation to the form 58. Inasmuch as the severed bag sheet lying upon the table is to be drawn onto a form and in a direction at right angles to the feed of the web, linear depressions 153 extending at angles to the line of openings 107 and communicating with the end openings, are provided opposite the plane of the bag sheet so as to increase the area of pneumatic grip effect and thus tend to tension and to maintain the separated bag sheet in smooth condition while it is being drawn from the table and folded around the form.

Referring to Fig. 14, the form 58 will be seen in its general position relative to the feed table, in which position it receives the separated bag sheet. It will be observed that the width of the table at this point is less than at other parts so that the bag sheet having been fed to this portion of the table will have one side overlying the form and tending to bend toward the form, the material of the bag sheet being tissue and therefore quite flexible. The position of the form to receive the bag sheet is intended to be quite close to the plane of the sheet as it lies upon the paper feed table.

As the paper web is fed along the paper feed table, the narrow glue carrying roller 105 contacts therewith and deposits a line of glue on the longitudinal edge, or side, of the web. This glue is received from the glue tank 154, and the amount deposited may be regulated by the scraper 155. The purpose of this glue is to adhesively secure the bag sheet in tubular form after it has been folded around the form, as hereinafter explained. The roller 105 is driven by the movement of the web.

Preferably the bags produced are cylindrical in shape, such as would be formed by being rolled around a form 58. One of the forms will take up the position illustrated generally in Fig. 14, where it lies just beneath the glued end of the bag sheet, said bag sheet having been advanced by the main feeding plate 118 from the position where it was severed from the web to predetermined alined position on table 101 transversely of the form 58. In this position the greater portion longitudinally of the glued edge of the sheet will lie above the form, but the end portion thereof will project beyond, or overlap, the end of the form in such position that it may be folded down against the glued face of the binder on the form. The vacuum openings 65 will then lie just beneath the glued edge of the sheet and, being energized, will cause said glued edge to be pneumatically gripped and thus attached to the cylindrical surface of the form, whereupon the form will be rotated on its axis so as to draw the bag sheet from the table 101 and fold it on the form. If desired, a light plate spring 156 may be attached to the undersurface of the feed plate 118 to positively depress the edge of the bag sheet toward the form to enable the pneumatic gripper to take hold. This spring, preferably, should be set in a little out of alinement with the glued edge of the web.

Figure 24:
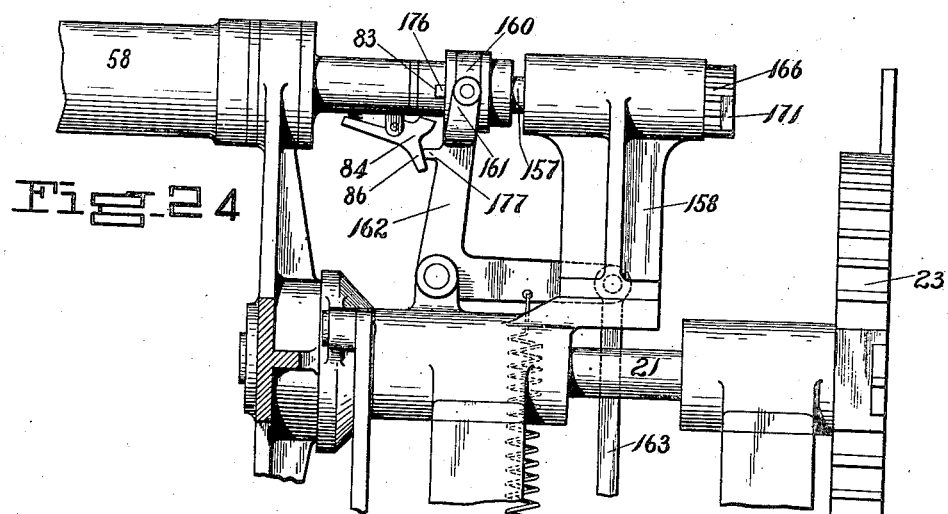
Fig. 24 is a side view of the parts illustrated in Fig. 23.
Figure 25:
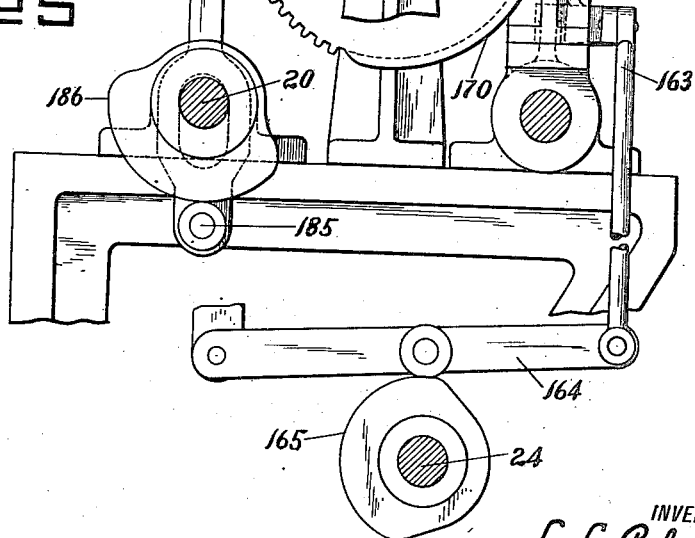
Fig. 25 is a detail view of the mechanism for rotating the forms relative to the turret.

To effect the axial rotation of the form, mechanism is employed which coöperates with the form stem 80 when at this station, being opposite a point of rest in the endless path of the forms. Directly opposite the stem 80 is a rotary clutch shaft 157 supported in a bearing on a standard 158 on the framework of the machine. Two collars 159 on this shaft embrace between them a clutch shifting ring 160 loose on the shaft 157 pivoted to a yoke 161 forming the termination of one arm 162 of a clutch shifter bell crank lever, the other arm of the clutch shifter lever being joined to a connecting rod 163 (Fig. 24), in turn coupled to a cam lever 164 operated by a cam 165 on the main cam shaft 24. It is found that the folding of the bag sheet on the form is more efficiently accomplished by rotating the form a plurality of times, and in the present instance three rotations are effected, the form being locked from axial rotation between each series of three rotations. Any suitable mechanism may be employed, but the mechanism illustrated is particularly efficient for the folding of tissue bag sheets. On the end of the shaft 157 is a pinion 166, which meshes and interlocks with a mutilated gear 167 on a shaft 168 supported in suitable frame standards and driven from the counter shaft 20 by a sprocket chain 169. The teeth of the pinion 166 are normally peripherally spaced around the full periphery so that the teeth of the gear 167 may rotate the pinion three times for only a partial rotation of the gear 167, whereupon a smooth circular convex surface 170 laterally on the gear 167, interlocks with a concave surface 171, formed by cutting away a portion of some of the teeth of the pinion 166, for a portion of their width, the surfaces 170 and 171 coöperating to hold the pinion 166 from axial rotation, and to hold the clutch 176 in predetermined position ready to register with the recess 83 in the next form. The teeth of pinion 166 are cut away in a circular arc adapted to intersect the periphery of this pinion, and the teeth of gear 167 are also cut away, as shown at 172, for a portion of their width, to permit the mutilated teeth of pinion 166 to pass during the rotation of the pinion. Provision is made for a gradual starting of the rotation of the pinion 166, as by a plate 173 on the face of gear 167, the side 174 of which progressively contacts with the side of a plate 175 extending from the pinion.

Figure 23:
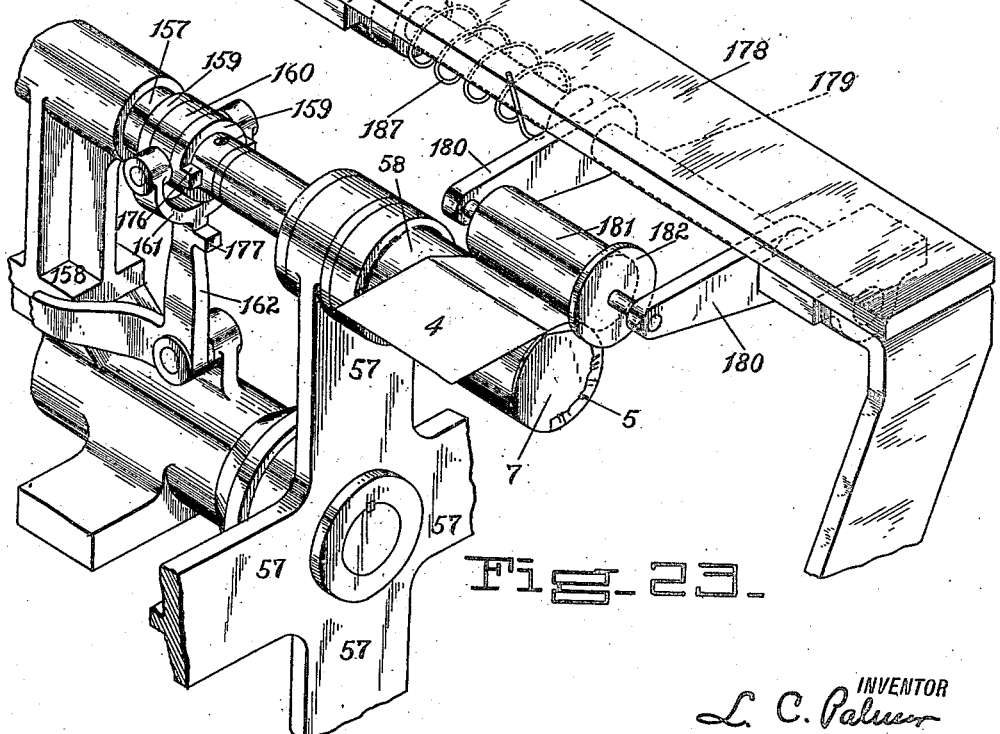
Fig. 23 is a perspective view of certain clutch operating mechanism and pressing and folding mechanism coöperating with the turret forms.

On the inner end of the shaft 157 is a clutch element or tooth 176 which when the shaft is at rest will be in alinement with the slot 83 in the stem 80 when said stem is at rest. On the clutch shifter lever 162 is a dog or lug 177 (Fig. 23) which is movable with the clutch element and adapted to coöperate with the arm 86 of the pawl 84 and lift the teeth of the pawl out of the slot 82 so as to permit the form stem 80 to rotate in its bearing on the turret arm.

Figure 3:
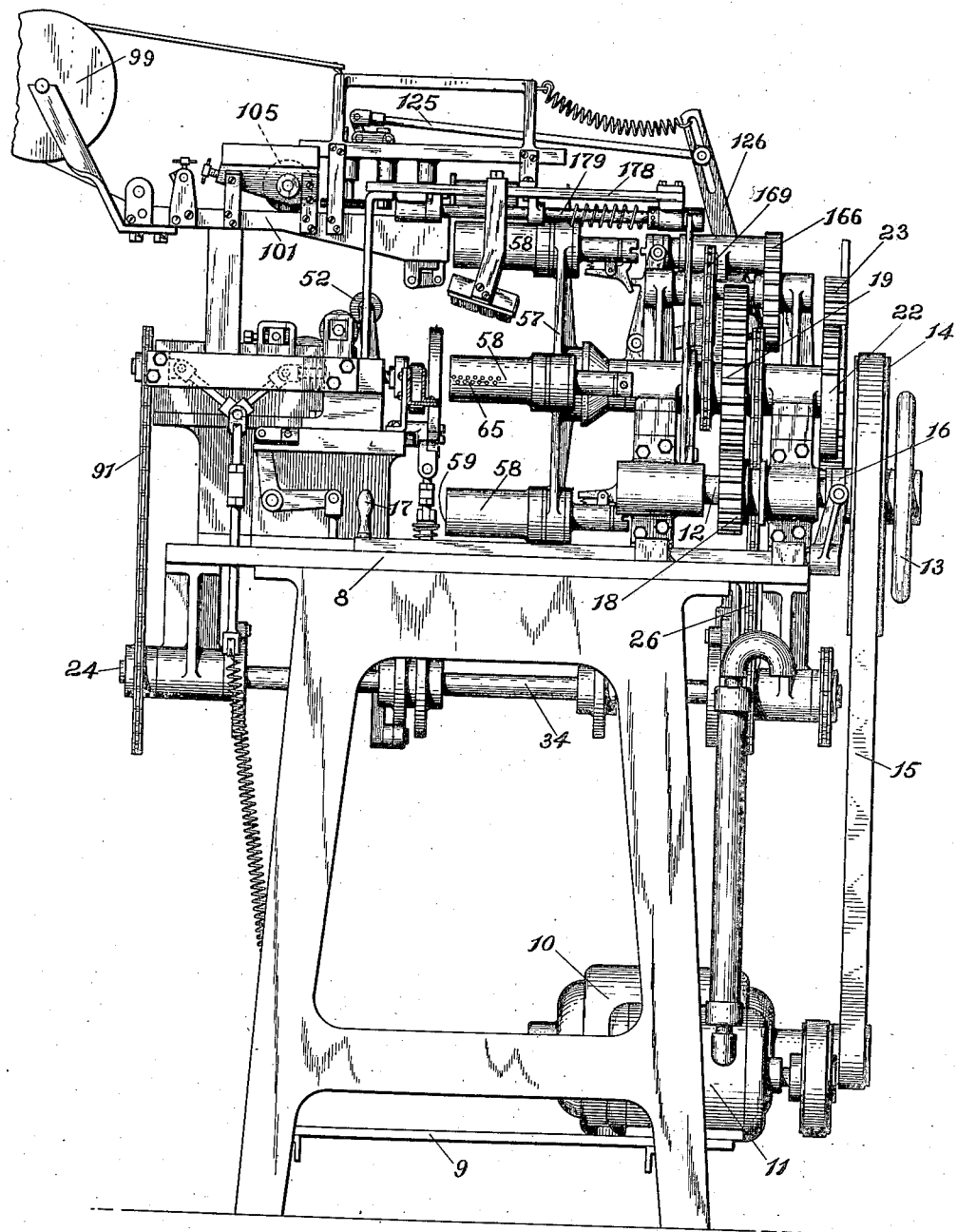
Figure 4:
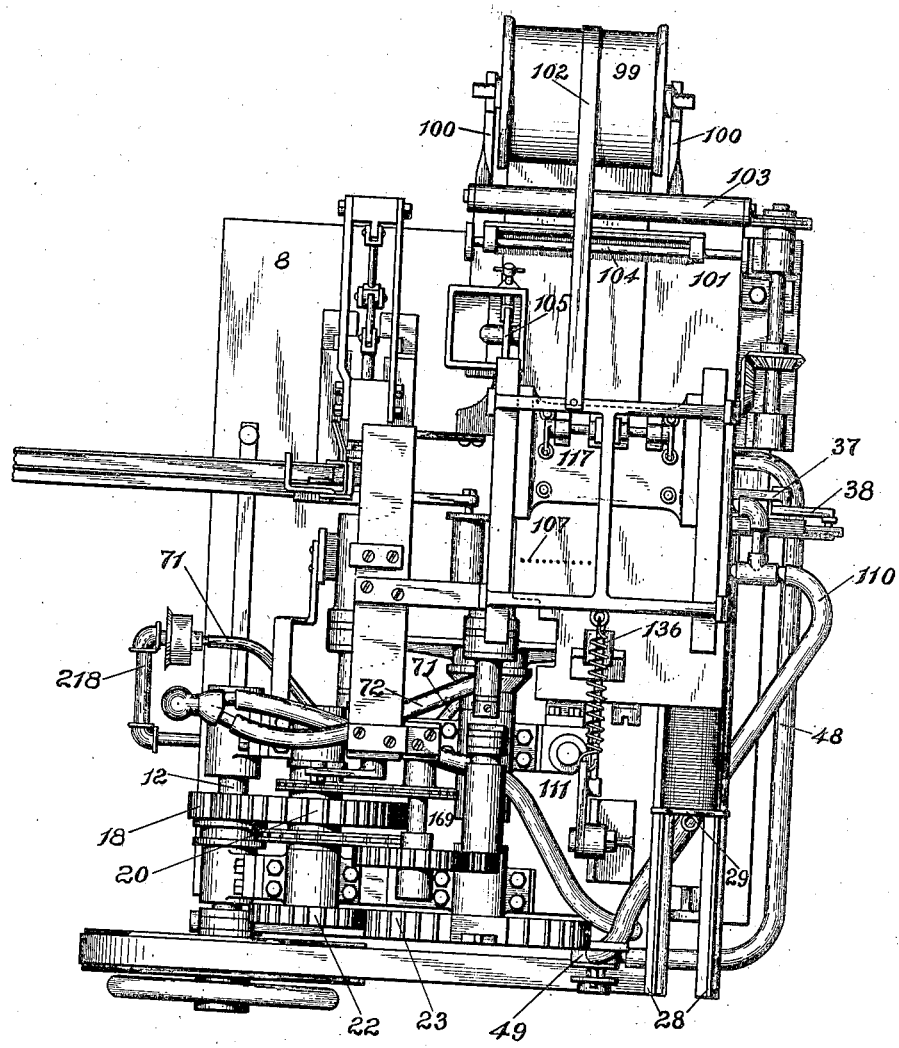
Fig. 4 is a plan view thereof.
Figure 5:
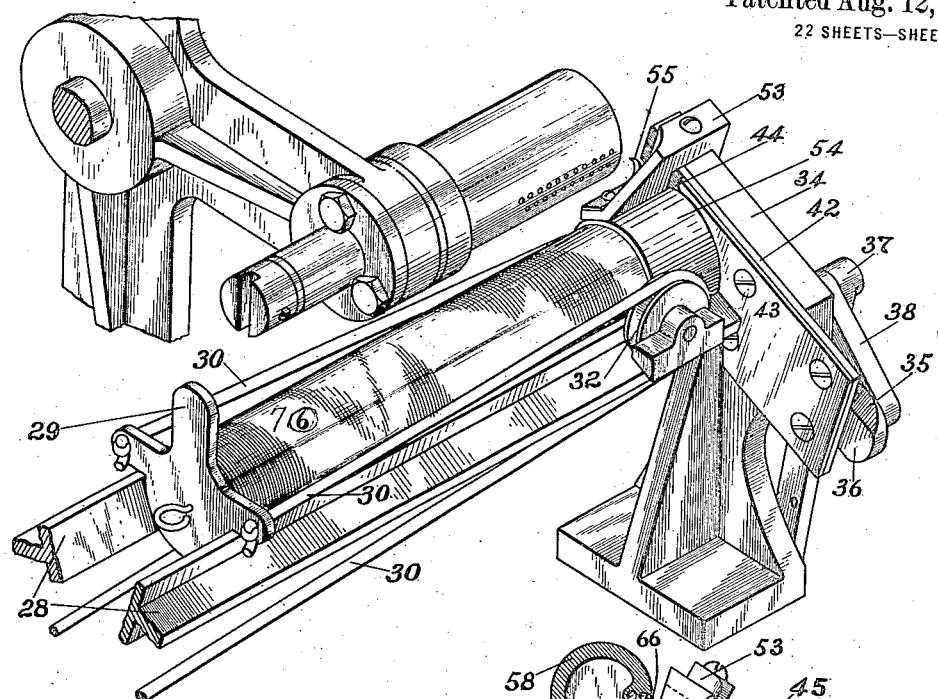
Fig. 5 is a perspective detail view of a binder or bag-head magazine and certain feed devices associated therewith.

As the machine operates, the cam 165 will move the shaft 157 inwardly to effect clutch engagement between the clutch tooth 176 and the slot 83; the same movement will cause the dog 177 to lift the pawl 84 out of the slot 82; the gear 166 will then be rotated from the gear 167 and thereby cause the rotation of the form 58 to which the bag sheet is pneumatically gripped at one edge. The rotation of the form 58 will draw the bag sheet from the paper feed table and cause it to be folded around the form. In the present instance the form will rotate three times, although it will be understood that it is only intended to make the bag sheet of sufficient length to have its end overlapped by one rotation of the form. The glue on the edge of the bag sheet readily penetrates the tissue paper so that when the opposite end of the sheet arrives in overlapping position it will adhere and a paper tube to form the bag side be produced. The multiple rotation of the form assists in the making of a smooth tube but is more especially designed efficiently to effect the turning or folding of the overhanging end of the bag sheet onto the glued face of the binder, which latter operation is effected as follows:

Journaled in bearings depending from an overhanging bracket 178 (Figs. 3 and 23) is a rock shaft 179 having arms 180 in which is journaled a pressing roller 181 having a flange 182 adapted to coöperate with the overhanging edge of the tissue sheet on the form 58 to press the paper against the form as the form rotates and to fold the overhanging edge over the end of the form and the edge of the binder 7 thereon, the paper being pressed into contact with the glue on the binder. An arm 183 is connected at one end of the rock shaft 179 and a rod 184 carrying a cam roller 185 coöperates with the cam 186 on the counter shaft 20 to positively move the roller away from the form 58. Coiled around the rock shaft 179 and adjustably affixed thereto at one end is a spring 187 which operates to move the pressing and folding roller against the paper on the form for performing its pressing and folding operations. The bag sheet having been pneumatically gripped to the form 58, and the form commencing to rotate on its axis, the roller 181 will be pressed against the paper as it is coiled around the form, and the flange 182 will fold the overhanging edge of the paper onto the glued face of the binder. The surface 181 will keep the paper for the bag side closely against the form and serve to press the joint at the glued portion and the several rotations of the form tends to cause the flange 182 to flatten, smooth and press the infolded end of the paper. In the present instance this pressing roller is rotated by the rotation of the form. By the foregoing a bag is automatically produced from raw material supplied to the machine. This bag is to be assembled with a base, the latter in the present embodiment consisting of a cylindrical box 1 (Fig. 36) having a flanged edge 3.

Figure 28:
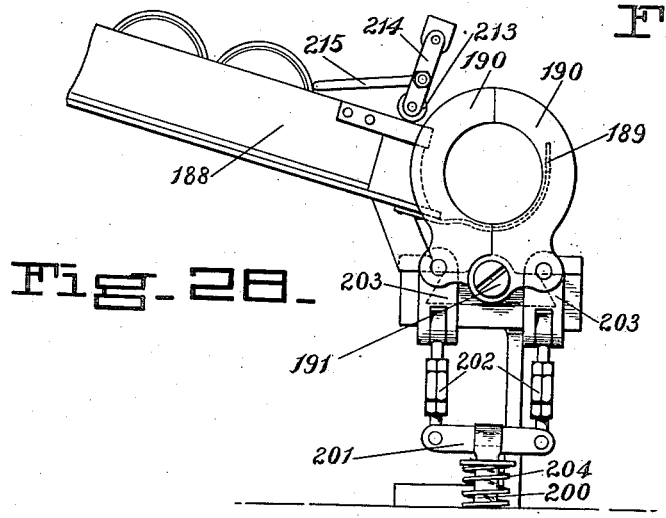
Fig. 28 is a side elevation thereof.
Figure 31:
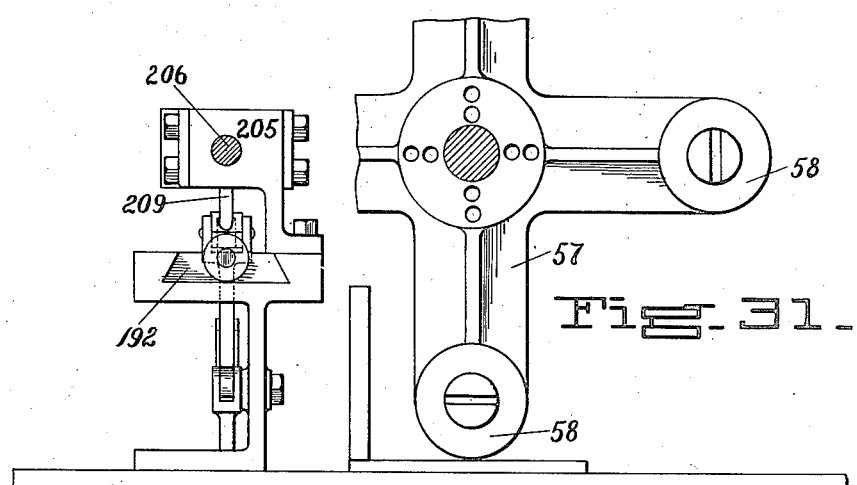
Fig. 31 is a detail view showing the operating devices for the box pusher device and the centering collar.

The bases, in the present instance boxes, are supplied from an inclined chute or guideway 188 (Fig. 28), the boxes advancing by rolling down the chute and one by one entering the trough 189 which is situated in front of the end of a form 58 when at the station next succeeding where it received the bag sheet. Between the trough 189 and the adjacent form 58 is disposed a box centering and carrying device comprising a split collar having the two halves 190 coaxially pivoted at 191 to a reciprocating slide 192 operated through the instrumentality of a rock lever 193 and connecting rod 194, a second rock lever 195 and a cam 196 on the cam shaft 24. The split collar is adapted to be opened and closed by a cam 197 on the shaft 24 coöperating with the rock lever 198 connected by a link 199 with a rod 200 pivotally joined to a cross head 201 to which are connected adjustable links 202 respectively pivotally attached to the arms 203 on the sections of the split collar. The cam 197 positively opens the collar sections, a spring 204 being employed to close them.

On the opposite side of the trough 189 from the form is a bearing 205 supporting a pusher rod 206 having a pushing head 207 adapted to abut the head of the box. Reciprocatory movements of the head 207 are effected by the spring 208 and the toggle 209 through the instrumentality of a connecting rod 210 pivoted to a rock lever 211 operated by a cam 212 on the cam shaft. The arrangement of the toggle is such as to decrease the rate of approach between the parts to be telescoped, and thereby to press the two heads together with an increasing pressure.

Figure 26:
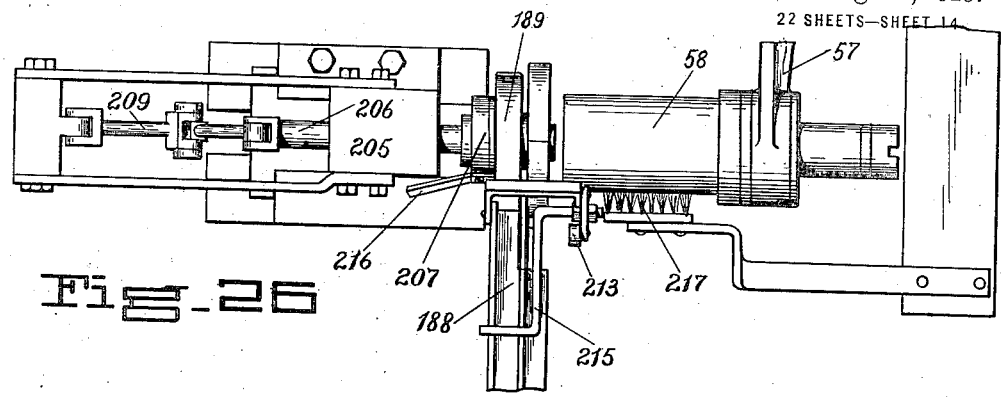
Fig. 26 is a plan view of the box feeding mechanism.
Figure 27:
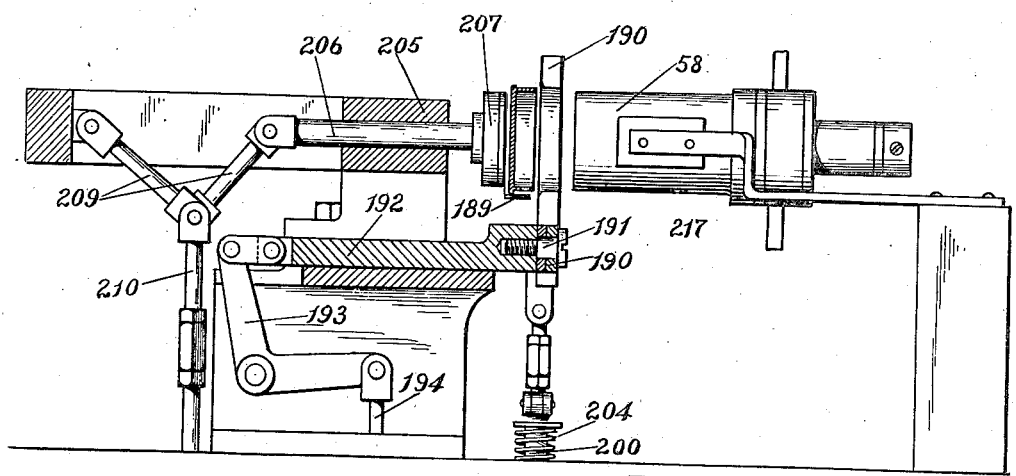
Fig. 27 is a sectional elevation of the box feed mechanism.

A box having entered the trough 189 with its open end facing the form then in position, the pusher head 207, which preferably has a rubber end face, pushes the box from the trough into the opening in the centering collar, the sections of the collar at that time being in closed relation. Thus the box will be accurately centered relative to the form 58 and the bag thereon. Thereupon both the pusher 207 and the centering collar, which latter is movable coaxially of the form 58, move toward the form and the box is carried by the collar and nicely telescoped or assembled over the end of the form and the bag thereon, thereby effecting the insertion of the bag in the box. The pusher 207 exercises a substantial pressure after such assembly to firmly press the head of the box against the glued exposed central portion of the binder or bag head, and in this manner the box and bag are adhesively secured together. The relation and construction of the operating parts are such that the pusher 207 dwells in this pressing relation while the split collar opens and until the split collar has returned some distance toward its initial position. As the split collar opens, one of its sections makes contact with a roller 213 (Figs. 29 and 30) mounted on an arm 214 of a box detent, which is movable into and out of position obstructing the advance of the boxes in the chute 188, so as to lift the detent rod 215 and permit another box to move toward the trough from the chute 188. In order to prevent the feed of the boxes from interfering with the operation of the pusher, said pusher is provided with a stop 216 movable in a line between the pusher and the detent which will prevent the entry of a succeeding box into the trough 189 until the pusher shall have returned to its initial operative condition, as illustrated, for instance, in Fig. 26. At the station where the boxes are assembled with the bags, as just referred to, a brush 217 is disposed and presses against the tissue of the bag so as to assist in holding the same in position during assembly of the boxes therewith.

In operation the pusher and split collar move toward the form and place the box thereon; then the collar travels a slight distance farther, say one-sixteenth of an inch, and both dwell in position to press and glue the assembled parts. Then the collar opens sufficiently to escape the flange of the box and returns to initial position. In opening the collar operates the detent to permit another box to move into position ready to enter the trough 189.

Figure 32:
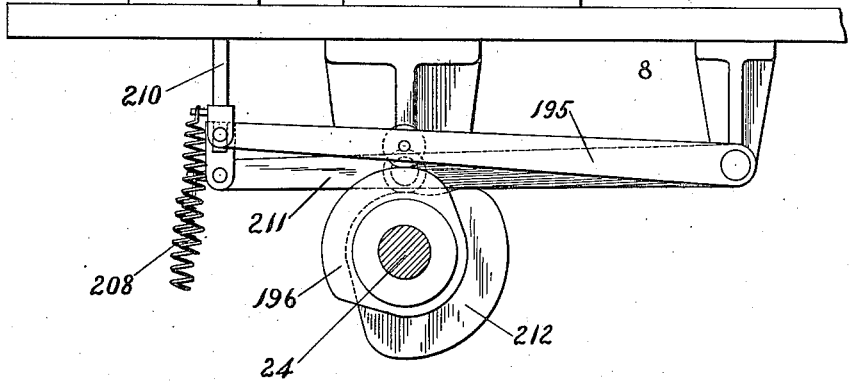
Fig. 32 is a plan view of a certain article ejecting device.

The boxes and bags having been assembled, as just related, the form-turret makes another rotary movement and carries the assembled articles to the lowest position which may be only slightly above the main table 8. At this station the pneumatic grip on the binder and on the tissue will be released and compressed air will be led through the central port 62 in the form and discharge the article from the form onto the table. If desired, an additional air blast may be provided, as by means of the compressed air pipe 218 (Fig. 32) which will assist in discharging the article immediately from the form and urge it away from the form. A hand operated valve 219 may be utilized to control the passage of air through pipe 218.

One or more of the mechanisms and consequent operation thereof may be modified without departing from the broader scope of the invention. For instance, as illustrated in Figs. 38 to 44, a different specific construction of form-rotating mechanism is illustrated. This modified form comprises a clutch element and shifter similar to that previously disclosed, but to the shaft of the clutch element is affixed a pinion 250, which meshes with a gear 251 rotatable with a pinion 252, a bracket or housing 253 being affixed to the frame work for the support of this mechanism. The numeral 254 indicates a rack meshing with the pinion 252 and extending downwardly in rod form through the main table 8, its lower end being coupled to rock lever 255 having cam roller 256 coöperating with a cam groove 257 in the cam disk 258. Adjacent the disk 258 is a second cam 259 which coöperates with a rock lever 260 having one end of a connecting rod 261 pivotally joined thereto, the other end of said rod being pivotally connected to the clutch shifting rock lever 263. Springs 264 and 265 may be employed as is usual in cam operated devices. The numeral 266 indicates a slip joint in the rack rod 254, which will yield in the event that the work opposing the lift of the rod should be too severe. As illustrated, the cam groove 257 is of such shape as to raise the rack 254 and thereby rotate the pinion 250 and consequently the bag form for say one-half a revolution, thus partially folding a bag sheet held on the form by the pneumatic gripper. A dwell then occurs in the rotation of the form, and during said dwell glue is applied to the bag sheet adjacent the line whereat it is gripped to the form, as will be described further on. The glue having been applied, a different portion of the cam groove 257 will cause further rotation of the form, in the present instance one and one-half additional rotations, so that a complete revolution of the cam disk 258 will result in two complete rotations of the form, and a return of the rack to its original position. The clutch element 176 is disengaged before rack 254 starts to descend. After disengaging of clutch, the latch 84 locks the form to prevent turning of same and the tooth part of clutch is rotated in the opposite direction on the return of rack to original position. Before the rack operates to make the initial one-half rotation of the form, the clutch element 176 will have been moved by the cam 259 into clutching coöperation with the form, the roller on the shift lever 263 serving to control the position of the locking pawl at this time.

When the one-half rotation of the form has been effected by the rack mechanism, as just described, glue is applied to the bag sheet then gripped to the form. The numeral 267 (Figs. 43, 44) indicates a glue carrying roller having a circumferential groove 268 which receives a substantial amount of glue from a supply roller 269, a glue tank and main glue delivery roller being shown at 270 and 271. The roller 267 is carried by a slide 272 reciprocating in a guideway 273, and operated by a link 274 connected to a rock arm 275 of a rock shaft 276, another arm 277 of the shaft 276 being operatively connected by rod 278 to a cam 279, a spring 280 being arranged to maintain coöperative relation between the cam 279 and the cam follower roller 281. The glue roller 267 reciprocates adjacent the path of translation of the forms, in the present instance adjacent that position of the form where it rotates to fold the bag sheet therearound. The half rotation of the form before described having been made, movement of the roller 267 longitudinally toward the form will cause the circumference of the roller to roll upon the edge of the bag sheet and apply a line of glue thereto. In order to insure that sufficient glue shall be deposited, the length of the circumference of the roller may be made at least as great as the extent of glue line to be applied, so that not more than one rotation of the roller will be required to apply glue to the full length desired.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:—

1. In an apparatus of the character described, in combination, a form, means adapted to apply a head and a bag side to said form in position to form a bag and means adapted to insert said bag in a box and press a wall of the bag against the interior of the box.

2. In an apparatus of the character described, in combination, means adapted to supply bags and glue the heads thereof, a box supply device, and means adapted to coöperate with said supply devices to insert the bags in said boxes, respectively, and press the glued heads against the interior of said boxes respectively to adhesively attach them thereto.

3. In an apparatus of the character described, in combination, means adapted to supply bags, a box supply device, means adapted to coöperate with said supply devices to insert the bags in said boxes, respectively, comprising a box centering device movable with a box into telescopic relation with a bag, and a device adapted to push a box into coöperative relation with said centering member prior to said telescopic assembly.

4. In an apparatus of the character described, in combination, a bag support, and means adapted to coöperate therewith to assemble a box with said bag comprising a reciprocatory box pusher, a reciprocatory box centering device, and means adapted to cause said pusher to push the box into coöperative relation with said centering device and move the latter therewith into telescopic relation with said bag.

5. In an apparatus of the character described, in combination, a bag support, and means adapted to coöperate therewith to assemble a box with said bag comprising a reciprocatory box pusher, a reciprocatory box centering device, and means adapted to cause said pusher to push the box into coöperative relation with said centering device and move the latter therewith into telescopic relation with said bag, said last mentioned means adapted to independently operate said pushing and centering devices.

6. In an apparatus of the character described, in combination, a bag support, and means adapted to coöperate therewith to assemble a box with said bag comprising a reciprocatory box pusher, a reciprocatory box centering device, and means adapted to cause said pusher to push the box into coöperative relation with said centering device and move the latter therewith into telescopic relation with said bag, said last mentioned means operating to advance said centering device relative to the box after telescopic relation has been attained.

7. In an apparatus of the character described, in combination, a bag support, a pusher reciprocable toward and from said support to telescopically assemble a box with a bag on said support, and means adapted to effect said reciprocation comprising a toggle operatively connected to said pusher to decrease the rate of approach between the parts to be telescoped and to press said parts together with an increasing pressure.

8. In an apparatus of the character described, in combination, a bag support, means comprising a pusher reciprocable toward and from said support to telescopically assemble a box with a bag on said support, and a box centering device movable axially of said support into and out of overlapping relation around said support.

9. In an apparatus of the character described, in combination, a bag support, means comprising a box carrying and centering collar adapted to reciprocate toward and from telescopic relation with said support, and means adapted to abut the box in said collar and urge the box into telescopic relation with said support with said collar.

10. In an apparatus of the character described, in combination, a bag support, means comprising a box carrying and centering collar adapted to reciprocate toward and from telescopic relation with said support, and reciprocatory means adapted to abut the box in said collar and urge the box into telescopic relation with said support with said collar.

11. In an apparatus of the character described, in combination, a bag support, a collar adapted to yieldingly press the side of a box and to center the box relative to said support, means adapted to reciprocate said collar into and out of telescopic relation to said support, and a reciprocatory box pusher adapted to move a box into said collar and with said collar toward said support.

12. In an apparatus of the character described, in combination, a bag support, a split box centering collar reciprocable into and out of overlapping relation to said support, a box pusher reciprocable toward and from said support, and means adapted to open said collar prior to its movement in a direction away from said support.

13. In an apparatus of the character described, in combination, a bag support, a split box centering collar reciprocable into and out of overlapping relation to said support, a box pusher reciprocable toward and from said support, and means adapted to open said collar prior to its movement in a direction away from said support and to close the same prior to its resumption of overlapping relation.

14. In an apparatus of the character described, in combination, a bag support, a split box centering collar reciprocable into and out of overlapping relation to said support, a box pusher reciprocable toward and from said support, and means adapted to open said collar prior to its movement in a direction away from said support, the moving means for said box pusher being so constructed as to cause said pusher to press the head of the box against the head of a bag on said support.

15. In an apparatus of the character described, in combination, a bag support, a split box centering collar reciprocable into and out of overlapping relation to said support, a box pusher reciprocable toward and from said support, and means adapted to open said collar prior to its movement in a direction away from said support during retrograde movement of said collar.

16. In an apparatus of the character described, in combination, a bag support, a split box centering collar reciprocable into and out of overlapping relation to said support, a box pusher reciprocable toward and from said support, means adapted to open said collar prior to its movement in a direction away from said support, a guideway for boxes advancing into coöperative relation to said pusher, a detent movable into and out of position obstructing the movement of said boxes in said guideway, and means whereby the opening movement of said collar moves said detent out of said obstructive position.

17. In an apparatus of the character described, in combination, a bag support, a split box centering collar reciprocable into and out of overlapping relation to said support, a box pusher reciprocable toward and from said support, means adapted to open said collar prior to its movement in a direction away from said support, a guideway for boxes advancing into coöperative relation to said pusher, a detent movable into and out of position obstructing the movement of said boxes, means whereby the opening movement of said collar moves said detent out of said obstructive position, and a box stop adapted to move in a line between said pusher and detent into and out of the path of the boxes in said guideway.

18. In an apparatus of the character described, in combination, a form, means adapted to attach a binder to the end of said form, means adapted to effect the folding of a bag sheet around the side of said form and the attaching of the same to said binder, said last mentioned means comprising a pneumatic gripper on the side of said form adapted to grip a side of the bag sheet thereto preliminarily to said folding, a support adapted to position the side of a bag sheet in coöperative relation with said form, and pneumatic gripping means adapted yieldingly to hold the bag sheet in said coöperative relation.

19. In an apparatus of the character described, in combination, a form, means adapted to attach a binder to the end of said form, means adapted to effect the folding of a bag sheet around the side of said form and the attaching of the same to said binder, said last mentioned means comprising a pneumatic gripper on the side of said form adapted to grip a side of the bag sheet thereto preliminarily to said folding, a support adapted to position the side of a bag sheet in coöperative relation with said form, and pneumatic gripping means adapted yieldingly to tension the bag sheet while being folded.

20. In an apparatus of the character described, in combination, a form, means adapted to attach a binder to the end of said form, means adapted to effect the folding of a bag sheet around the side of said form and the attaching of the same to said binder, said last mentioned means comprising a pneumatic gripper on the side of said form adapted to grip a side of the bag sheet thereto preliminarily to said folding, a support adapted to position the side of a bag sheet in coöperative relation with said form, and pneumatic gripping means adapted to yieldingly hold the bag sheet in said coöperative relation, said last mentioned means comprising a plurality of lines of pneumatic grippers disposed at angles to each other opposite the plane of the bag sheet.

21. In an apparatus of the character described, in combination, a form, means adapted to attach a binder to the end of said form, means adapted to effect the folding of a bag sheet around the side of said form and the attaching of the same to said binder, a support adapted to position the side of a bag sheet in coöperative relation with said form, and a plurality of lines of pneumatic grippers disposed at angles to each other opposite the bag sheet on said support adapted to yieldingly hold and control the bag sheet.

22. In an apparatus of the character described, in combination, a form, means adapted to attach a binder to the end of said form, means adapted to effect the folding of a bag sheet around the side of said form and the attaching of the same to said binder, said last mentioned means comprising a pneumatic gripper on the side of said form adapted to grip a side of the bag sheet thereto preliminarily to said folding, a support adapted to position the side of a bag sheet in coöperative relation with said form, pneumatic gripping means adapted to yieldingly hold the bag sheet in said coöperative relation, means adapted to energize and deënergize said pneumatic grippers, and means whereby the energization and deënergization of said pneumatic grippers may be timed relatively to each other.

23. In an apparatus of the character described, in combination, a form, means adapted to attach a binder to the end of said form, means adapted to effect the folding of a bag sheet around the side of said form and the attaching of the same to said binder, said last mentioned means comprising a pneumatic gripper on the side of said form adapted to grip a side of the bag sheet thereto preliminarily to said folding, a support adapted to position the side of a bag sheet in coöperative relation with said form, and pneumatic gripping means adapted yieldingly to hold the bag sheet in said coöperative relation, said first mentioned means comprising an end face of said form adapted to serve as a pneumatic gripper for said binder, means adapted to energize and deënergize said pneumatic grippers, and means whereby the energization and deënergization of said pneumatic grippers may be timed relatively to each other.

24. In an apparatus of the character described, in combination, a form, means adapted to attach a binder to the end of said form, means adapted to effect the folding of a bag sheet around the side of said form and the attaching of the same to said binder, said last mentioned means comprising a pneumatic gripper on the side of said form adapted to grip a side of the bag sheet thereto preliminarily to said folding, a support adapted to position the side of a bag sheet in coöperative relation with said form, and pneumatic gripping means adapted to yieldingly hold the bag sheet in said coöperative relation, said last mentioned means comprising a plurality of lines of pneumatic grippers disposed at angles to each other opposite the plane of the bag sheet, said first mentioned means comprising an end face adapted to serve as a pneumatic gripper for said binder, means adapted to energize and deënergize said pneumatic grippers, and means whereby the energization and deënergization of said pneumatic grippers may be timed relatively to each other.

25. In an apparatus of the character described, in combination, a form, means adapted to attach a binder to the end of said form, a support adapted to position the side of a bag sheet in coöperative relation with said form, means to grip the side of the bag sheet to said form, means adapted to rotate said form thereby drawing the bag sheet from said support and folding it on said form, and a device adapted to coöperate with the end of said sheet and fold it around the edge of said binder against the face thereof while said form is rotating.

26. In an apparatus of the character described, in combination, a form, means adapted to attach a binder to the end of said form, a support adapted to position the side of a bag sheet in coöperative relation with said form, means to grip the side of the bag sheet to said form, means adapted to rotate said form thereby drawing the bag sheet from said support and folding it on said form, and means adapted yieldingly to pneumatically grip the bag sheet to said support while being folded around said form.

27. In an apparatus of the character described, in combination, a form, means adapted to attach a binder to the end of said form, a support adapted to position the side of a bag sheet in coöperative relation with said form, means to grip the side of the bag sheet to said form, means adapted to rotate said form thereby drawing the bag sheet from said support and folding it on said form, a device adapted to coöperate with the end of said sheet and fold it around the edge of said binder against the face thereof while said form is rotating, and means adapted yieldingly to pneumatically grip the bag sheet to said support while being folded around said form.

28. In an apparatus of the character described, in combination, means adapted automatically to supply material for the head and sides of a bag comprising a head magazine, head feed mechanism and tissue web feeding and cutting devices for the material for the sides, means adapted automatically to coöperate with said supply means to make a bag from said material including its head, and means adapted automatically to coöperate with the aforesaid means to assemble said bag in open condition in a box.

29. In an apparatus of the character described, in combination, means adapted automatically to supply material for the head and sides of a bag, means adapted automatically to coöperate with said supply means to make a bag from said material including its head, comprising a rotatable form to which the heads are fed and around which the sides are folded, and means adapted automatically to coöperate with the aforesaid means to assemble said bag in open condition in a box.

30. In an apparatus of the character described, in combination, means automatically to supply material for the head and sides of a bag, means comprising a form adapted automatically to coöperate with said supply means to make a bag from said material including its head, and means adapted automatically to coöperate with the aforesaid means to assemble said bag in open condition in a box comprising a device adapted to contact the sides of the box at a plurality of points around the axis of said form when the bag is in said box and thereby position said box and bag relative to each other transversely of said form.

31. In an apparatus of the character described, in combination, means adapted automatically to supply material for the head and sides of a bag, comprising a head magazine, head feed mechanism and tissue web feeding and cutting devices for the material for the sides, means adapted automatically to coöperate with said supply means to make a bag from said material including its head, comprising a rotatable form to which the heads are fed and around which the sides are folded, and means adapted automatically to coöperate with the aforesaid means to assemble said bag in open condition in a box.

32. In an apparatus of the character described, in combination, means adapted automatically to supply material for the head and sides of a bag, comprising a head magazine, head feed mechanism and tissue web feeding and cutting devices for the material for the sides, means comprising a rotatable form adapted automatically to coöperate with said supply means to make a bag including its head, and means adapted automatically to coöperate with the aforesaid means to assemble said bag in open condition in a box, comprising a device adapted to contact the sides of the box at a plurality of points around the axis of said form when the bag is in said box and thereby position said box and bag relatively to each other transversely of said form.

33. In an apparatus of the character described, in combination, means adapted automatically to supply material for the head and sides of a bag, means adapted automatically to coöperate with said supply means to make a bag including its head, comprising a rotatable form to which the heads are fed and around which the sides are folded, and means adapted automatically to coöperate with the aforesaid means to assemble said bag in open condition in a box, comprising a device adapted to contact the sides of the box at a plurality of points around the axis of said form when the bag is in said box and thereby position said box and bag relatively to each other transversely of said form.

34. In an apparatus of the character described, in combination, means adapted automatically to supply material for the head and sides of a bag, comprising a head magazine, head feed mechanism and tissue web feeding and cutting devices for the material for the sides, means adapted automatically to coöperate with said supply means to make a bag including its head, comprising a rotatable form to which the heads are fed and around which the sides are folded, and means adapted automatically to coöperate with the aforesaid means to assemble said bag in open condition in a box, comprising a device adapted to contact the sides of the box at a plurality of points around the axis of said form when the bag is in said box and thereby position said box and bag relatively to each other transversely of said form.

35. In an apparatus of the character described, in combination, a plurality of rotatable forms intermittently translatable in an endless path, said forms comprising means for the grip of sheets thereto, and means adapted to rotate the form to which a sheet is attached and thereby fold said sheet around said form, said rotative means comprising a rotative clutch element movable into and out of clutch coöperation with said forms.

36. In an apparatus of the character described, in combination, a plurality of rotatable forms intermittently translatable in an endless path, said forms comprising means for the grip of sheets thereto, means adapted to rotate the form to which a sheet is attached and thereby fold said sheet around said form, said rotative means comprising a rotative clutch element movable into and out of clutch coöperation with said forms, and form locking elements translatable with said forms and movable into and out of locking position by movements of said clutch element.

37. In an apparatus of the character described, in combination, a plurality of rotatable forms intermittently translatable in an endless path, said forms comprising means for pneumatic grip of sheets to said forms, means adapted to rotate the form to which a sheet is attached and thereby fold the sheet therearound, and control means adapted to maintain said pneumatic grip during rotation of said form, said rotative means comprising a rotative clutch element movable into and out of clutch coöperation with said forms, form-locking pawls translatable with said forms and movable into and out of locking position, and means movable with said clutch element adapted to operate said pawls.

38. In an apparatus of the character described, in combination, a rotatable turret, a plurality of forms rotatable on said turret, passageways for air rotatable with said turret, passageways in said forms having ports adapted to communicate with the passageways of said turret, pneumatic gripper openings in said forms communicating with the passageways in said forms, a vacuum pump, a valve adapted to control the passage of air between said pump and the passageways in said forms, and means adapted to control the operation of said valve, said turret comprising a hub having ports leading to the passageways of the turret, and said valve comprising a chambered member oscillatable relative to said turret and having a part adapted to coöperate with the ports in said hub to open and close said ports at predetermined points in the rotation of said turret.

39. In an apparatus of the character described, in combination, a plurality of rotatable forms intermittently translatable in an endless path, said forms comprising means for the grip of sheets thereto, and means adapted to rotate the form to which a sheet is attached and thereby fold said sheet around said form, said last-mentioned means comprising a device opposite a point of rest in said endless path adapted to rotate said form a plurality of times between two succeeding intervals of rest in said endless path.

40. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times to effect folding of said bag sheets.

41. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times, said binder feed device comprising a reciprocatory binder feed plate having a recess to properly position a binder thereon and a spring adapted to aline the binder on said plate with said forms.

42. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, means adapted to rotate said forms at predetermined times, said binder feed device comprising a reciprocatory binder feed plate having a recess to properly position a binder thereon, a spring adapted to aline the binder on said plate with said forms, and means adapted to positively move said plate toward said forms.

43. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times, said bag sheet supply comprising a bag sheet supporting table opposite the path of said forms and pneumatic gripper openings in said table adapted to control the bag sheet being folded around a form.

44. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times, said gripping means comprising pneumatic gripper openings in said forms adapted to grip the bag sheets while being folded around said forms.

45. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times, said form rotating means comprising an automatically operating rotative clutch adapted to move into and out of coöperative engagement with said forms.

46. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times, said binder feed device comprising a reciprocatory binder feed plate having a recess to properly position a binder thereon and a spring adapted to aline the binder on said plate with said forms, said bag sheet supply comprising a bag sheet supporting table opposite the path of said forms and pneumatic gripper openings in said table adapted to control the bag sheet being folded around a form.

47. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times, said binder feed device comprising a reciprocatory binder feed plate having a recess to properly position a binder thereon and a spring adapted to aline the binder on said plate with said forms, said bag sheet supply comprising a bag sheet supporting table opposite the path of said forms and pneumatic gripper openings in said table adapted to control the bag sheet being folded around a form, and said form gripping means comprising pneumatic gripper openings in said forms adapted to grip the bag sheets while being folded around said forms.

48. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times, said binder feed device comprising a reciprocatory binder feed plate having a recess to properly position a binder thereon and a spring adapted to aline the binder on said plate with said forms, said bag sheet supply comprising a bag sheet supporting table opposite the path of said forms and pneumatic gripper openings in said table adapted to control the bag sheet being folded around a form, said form gripping means comprising pneumatic gripper openings in said forms adapted to grip the bag sheets while being folded around said forms, and said form rotating means comprising an automatically operating rotative clutch adapted to move into and out of coöperative engagement with said forms.

49. In an apparatus of the character described, in combination, a binder magazine comprising a pair of binder supporting rods, a reciprocatory binder feed plate movable across the end of said magazine transversely of said rods, and having a recess for the reception of a binder from the magazine, a pneumatic gripper disk carried by said plate movable transversely of the direction of movement of said plate, a spring tending to press said disk toward said plate, and a stationarily supported spring adapted to press said carried binder toward said disk.

50. In an apparatus of the character described, in combination, a box supply device, and means adapted to coöperate with boxes from said supply and feed them in a predetermined direction, comprising a reciprocatory split collar box carrier, and a reciprocatory pusher movable toward and from the plane of the head of a box in said carrier.

51. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, means adapted to rotate said forms at predetermined times, and means adapted to move a box over the binder and the folded bag sheet on said forms for assembly therewith.

52. In an apparatus of the character described, in combination, a rotary turret, a plurality of forms rotatably mounted on said turret, a device adapted to feed binders to said forms, a bag sheet supply, means adapted to effect the grip of bag sheets to said forms, in relation to be folded around said forms and the binders thereon, means adapted to rotate said turret intermittently, means adapted to rotate said forms at predetermined times, and means adapted to move a box over the binder and the folded bag sheet on said forms and press the box against said binder.

53. In an apparatus of the character described, in combination, an intermittently rotatable form, means comprising pneumatic gripper openings in the side of said form adapted to grip a bag sheet to said form for rotation therewith so as to be folded around said form, and a glue carrier adapted to apply glue adjacent the gripped portion of sheet while on said form so that overlapped portions of the folded sheet shall be adhesively secured together.

54. In an apparatus of the character described, in combination, an intermittently rotatable form, means comprising pneumatic gripper openings on the side of said form adapted to grip a bag sheet to said form for rotation therewith so as to be folded around said form, and a glue carrier adapted to apply glue to the sheet while on said form so that overlapped portions of the folded sheet shall be adhesively secured together, said glue carrier comprising a roller having a glue carrying circumferential length at least as great as the length of surface to be glued.

55. In an apparatus of the character described, in combination, an intermittently rotatable form, means comprising pneumatic gripper openings on the side of said form adapted to grip a bag sheet to said form for rotation therewith so as to be folded around said form, and a glue carrier adapted to apply glue to the sheet while on said form so that overlapped portions of the folded sheet shall be adhesively secured together, said glue carrier comprising a roller having a grooved glue carrying circumferential length at least as great as the length of surface to be glued.

56. In an apparatus of the character described, in combination, a translatable form, and means adapted at a predetermined point in the path of translation to intermittently rotate said form, comprising a rotatable and translatable clutch element adapted to move into and out of clutching engagement with said form, a pinion translatable and rotatable with said clutch element, a gear adapted to mesh with said pinion and means to intermittently rotate said gear comprising a rack to engage said gear and a cam to control the movement of said rack.

57. In an apparatus of the character described, in combination, a translatable form, and means adapted at a predetermined point in the path of translation to intermittently rotate said form comprising a rotatable and translatable clutch element adapted to move into and out of clutching engagement with said form, a pinion translatable and rotatable with said clutch element, a gear adapted to mesh with said pinion, means to intermittently rotate said gear comprising a rack to engage said gear and a cam to control the movements of said rack, a clutch element shifting member, and means to operate the same comprising a cam.

58. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, and means adapted to rotate said forms at predetermined times, said binder feed device comprising a plate movable to advance binders to said forms having means adapted to properly position a binder on said plate comprising a pneumatic gripper, and means adapted to energize and deënergize said pneumatic gripper.

59. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, means adapted to rotate said forms at predetermined times, said binder feed device comprising a magazine for binders, a plate movable to advance binders to said forms having means adapted to properly position a binder on said plate comprising a pneumatic gripper movable toward and from the faces of the binders in the magazine, means adapted to energize and deënergize said pneumatic gripper, and means adapted to move said pneumatic gripper toward and from said faces.

60. In an apparatus of the character described, in combination, a rotary turret, a plurality of forms rotatably mounted on said turret, a device adapted to feed binders to said forms, a bag sheet supply, means adapted to effect the grip of bag sheets to said forms in relation to be folded around said forms and the binders thereon, means adapted to rotate said turret intermittently, means adapted to rotate said forms at predetermined times, said binder feed device comprising a magazine for binders, a plate movable to advance binders to said forms having means adapted to properly position a binder on said plate comprising a pneumatic gripper movable toward and from the faces of the binders in the magazine, means adapted to energize and deënergize said pneumatic gripper, means adapted to move said pneumatic gripper toward and from said faces, and a spring adapted to aline the binder on said plate with the form to which it is fed.

61. In an apparatus of the character described, in combination, a bag support, and means adapted to coöperate therewith to assemble a box with said bag comprising a reciprocatory box pusher, a reciprocatory box centering device, and means adapted to cause said pusher to push the box into coöperative relation with said centering device and move the latter therewith into telescopic relation with said bag, comprising a toggle operatively connected to said pusher to decrease the rate of approach of the parts to be telescoped and to press said parts with an increasing pressure.

62. In an apparatus of the character described, in combination, a rotatable form comprising a pneumatic gripper on the periphery thereof adapted to grip a sheet to be folded on said form by the rotation of the latter, a support for the sheet to be so gripped to said form, said support comprising a pneumatic gripper adapted to yieldingly hold said sheet in position to be gripped to said form, and means adapted to energize and deënergize said pneumatic grippers in timed relation to each other.

In testimony whereof I affix my signature, in the presence of two witnesses.

LYNDON C. PALMER.

Witnesses:
HAROLD C. COPPINS,
FRANK B. CLAYTON.